(12) United States Patent
Hug et al.

(10) Patent No.: US 7,685,646 B1
(45) Date of Patent: Mar. 23, 2010

(54) SYSTEM AND METHOD FOR DISTRIBUTING PROTECTED AUDIO CONTENT ON OPTICAL MEDIA

(75) Inventors: Joshua D. Hug, Seattle, WA (US); Alain Hamel, North Bend, WA (US); Adam B. Cappio, Seattle, WA (US); Brent D. Newman, Sammamish, WA (US); Xiaodong Fu, Fairfax, VA (US); Rahul Agarwal, Issaquah, WA (US); Jeffrey M. Ayars, North Bend, WA (US)

(73) Assignee: RealNetworks, Inc., Seattle, WA (US)

( * ) Notice: Subject to any disclaimer, the term of this patent is extended or adjusted under 35 U.S.C. 154(b) by 1678 days.

(21) Appl. No.: 10/659,985

(22) Filed: Sep. 10, 2003

(51) Int. Cl.
G06F 7/04 (2006.01)
G06F 17/30 (2006.01)
H04N 7/16 (2006.01)

(52) U.S. Cl. .......................... 726/30; 713/160; 726/28; 726/29

(58) Field of Classification Search ................. 713/160, 713/193; 726/26, 27, 28, 29, 30, 31, 33
See application file for complete search history.

(56) References Cited

U.S. PATENT DOCUMENTS

| | | | | |
|---|---|---|---|---|
| 5,646,920 A * | 7/1997 | Raczynski | ............... | 369/41.01 |
| 5,699,434 A * | 12/1997 | Hogan | ........................... | 705/57 |
| 6,104,679 A * | 8/2000 | Sollish | ...................... | 369/53.21 |
| 6,353,173 B1 * | 3/2002 | D'Amato et al. | ............... | 84/609 |
| 6,418,421 B1 * | 7/2002 | Hurtado et al. | ................ | 705/54 |
| 6,446,073 B1 * | 9/2002 | D'Amato et al. | ............. | 707/101 |
| 6,510,502 B1 * | 1/2003 | Shimizu | ...................... | 711/164 |
| 6,523,113 B1 * | 2/2003 | Wehrenberg | ................. | 713/176 |
| 6,611,812 B2 * | 8/2003 | Hurtado et al. | ............... | 705/26 |
| 6,952,479 B2 * | 10/2005 | Shavit et al. | ................. | 380/201 |
| 6,971,024 B1 * | 11/2005 | Sako et al. | .................... | 713/193 |
| 6,983,371 B1 * | 1/2006 | Hurtado et al. | .............. | 713/189 |
| 7,110,984 B1 * | 9/2006 | Spagna et al. | .................. | 705/57 |
| 7,206,748 B1 * | 4/2007 | Gruse et al. | ...................... | 705/1 |
| 7,376,626 B2 * | 5/2008 | Nagai et al. | .................... | 705/57 |
| 7,401,231 B2 * | 7/2008 | Taki et al. | .................... | 713/193 |
| 7,426,637 B2 * | 9/2008 | Risan et al. | ................... | 713/165 |
| 7,480,942 B2 * | 1/2009 | Inokuchi et al. | ................ | 726/27 |
| 7,530,083 B2 * | 5/2009 | Benedikt et al. | ............. | 720/719 |
| 7,546,616 B2 * | 6/2009 | Benedikt et al. | ............. | 720/719 |
| 2002/0001277 A1 * | 1/2002 | Thomas | .................... | 369/59.21 |
| 2003/0126445 A1 * | 7/2003 | Wehrenberg | ................. | 713/176 |
| 2003/0159037 A1 * | 8/2003 | Taki et al. | .................... | 713/168 |
| 2003/0169878 A1 * | 9/2003 | Miles | .......................... | 380/201 |
| 2004/0030909 A1 * | 2/2004 | Sako et al. | ................... | 713/193 |
| 2004/0096189 A1 * | 5/2004 | Sako et al. | ...................... | 386/94 |
| 2004/0186993 A1 * | 9/2004 | Risan et al. | ................... | 713/164 |
| 2004/0236945 A1 * | 11/2004 | Risan et al. | ................. | 713/165 |
| 2005/0005142 A1 * | 1/2005 | Fontijn | ........................ | 713/193 |

(Continued)

Primary Examiner—David Garcia Cervetti
(74) Attorney, Agent, or Firm—Graybeal Jackson LLP

(57) ABSTRACT

A system and method for producing and using a protected optical media is described. One feature provides for a compact disc containing digital rights management protection to prevent unauthorized copying of copyrighted materials. Another feature provides for secure copying, storage, transfer, and playback of digital audio content from a protected compact disc or computer storage. Yet another feature provides for a versatile optical media that can be used in both traditional audio compact disc players and in computer CD-ROM drives without risking the security of the content on the media or preventing purchasers from having a robust content experience.

68 Claims, 12 Drawing Sheets

U.S. PATENT DOCUMENTS

2005/0039032 A1* 2/2005 Babowicz et al. ........... 713/193
2005/0223240 A1* 10/2005 Miles ........................ 713/193
2005/0229013 A1* 10/2005 Babowicz et al. ........... 713/193
2008/0212441 A1* 9/2008 Babowicz .................... 369/83

* cited by examiner

SYSTEM AND METHOD FOR DISTRIBUTING PROTECTED AUDIO CONTENT ON OPTICAL MEDIA

BACKGROUND OF THE INVENTION

1. Field of the Invention

This invention relates to the distribution of protected digital audio data. More particularly, the invention relates to the creation and use of a protected audio compact disc.

2. Description of the Related Art

The compact disc continues to be a very popular media type for distributing digital audio content. However, in recent years, technologies have developed, such as compact disc-read-only memory ("CD-ROM") drives and the Moving Pictures Expert Group ("MPEG"), audio layer 3 ("mp3") data format, which allow quick copying of the audio data contained on most compact discs into formats that can be easily shared over the Internet to thousands of people. These technologies allow non-paying users to access and distribute the audio content cheaply and with virtually no limitations. This reduces the incentives to produce the audio content and threatens a social cost as fewer content producers are willing to take the risk of theft by releasing their work for sale on compact disc.

Existing systems, such as one developed by Macrovision, attempt to solve this problem by incorporating technology onto audio compact discs that prevents the discs from being read by a computer CD-ROM drive but yet still allows them to be read by traditional audio compact disc players. While this technology does help prevent rampant copying of compact discs, it has the unfortunate effect of preventing audio content purchasers from accessing their legally-acquired audio content through their computers. With existing systems, if the audio data cannot be read by a computer, it cannot be used for allowed purposes, such as storage on the computer's hard drive for backup or playback purposes or transfer to a portable digital audio device. With the increased usage of computers and portable audio devices, limitations such as these can severely hurt the commercial viability of such a protected CD.

What is needed is a system that prevents unlicensed copying of audio data from a CD, but that still allows authorized forms of computer-related access to purchasers.

BRIEF DESCRIPTION OF THE DRAWINGS

A computer-implemented media distribution system will now be described with reference to the following drawings:

FIG. 10 is a flowchart illustrating, in one embodiment of the invention, a process that is performed by a user's computer in order to verify that software received from the protected compact disc of FIG. 1 has not been tampered with.

DETAILED DESCRIPTION OF THE PREFERRED EMBODIMENT

The aspects, features and advantages of the invention will be better understood by referring to the following detailed description in conjunction with the accompanying drawings. These drawings and the associated description are provided to illustrate embodiments of the invention, and not to limit the scope of the invention. The embodiments described below overcome obstacles to protected distribution of audio content on optical media.

The system and methods described below seek to remedy deficiencies in current systems by providing a digital optical medium (e.g., a compact disc, digital versatile disk) or flash/removable memory that can allow protected access by both traditional audio compact disc players as well as computer CD-ROM drives or flash memory drive, while preventing unauthorized access. In one instance, the system and methods below provide a session, i.e., a readable data section, on the protected compact discs that contains content that is readable by traditional audio compact disc players but that is prevented from being accessed by computer CD-ROM drives. To allow computer users to have access to the audio content, the methods further provide a second session, readable by CD-ROM drives but not by audio compact disc players, that contains encrypted copies of the same content contained on the first session. This system also provides for digital rights management software to be contained in the same session as the encrypted audio content, where the digital rights management software is designed to decrypt the encrypted audio content only under strict conditions, preventing unauthorized access to the encrypted audio content. In this manner, a purchaser of such a protected compact disc can have access to the audio content via a computer without being able to make unauthorized copies of the content. The combination of allowing audio player access as well as CD-ROM drive access provides the purchaser of a protected compact disc a media product which, while protecting the content on the disc, provides relatively transparent and versatile usage of that content.

In addition, the system and methods described below provide digital rights management software that allows a purchaser to perform additional desired activities with the audio content, such as creating copies of the audio content onto the hard drive of the purchaser's computer, or downloading copies of the content to a portable device. In order to prevent unauthorized usage of this copied content, the system and methods described below provide that copied audio content will be protected by digital rights management software on the hard drive or portable device destination as well. Finally, the system and methods described below provide multiple levels of encryption for the audio content and tamper-prevention and tamper-detection techniques for software that encounters unencrypted audio data, providing additional security for the audio content contained on the compact disc.

Figure 1:
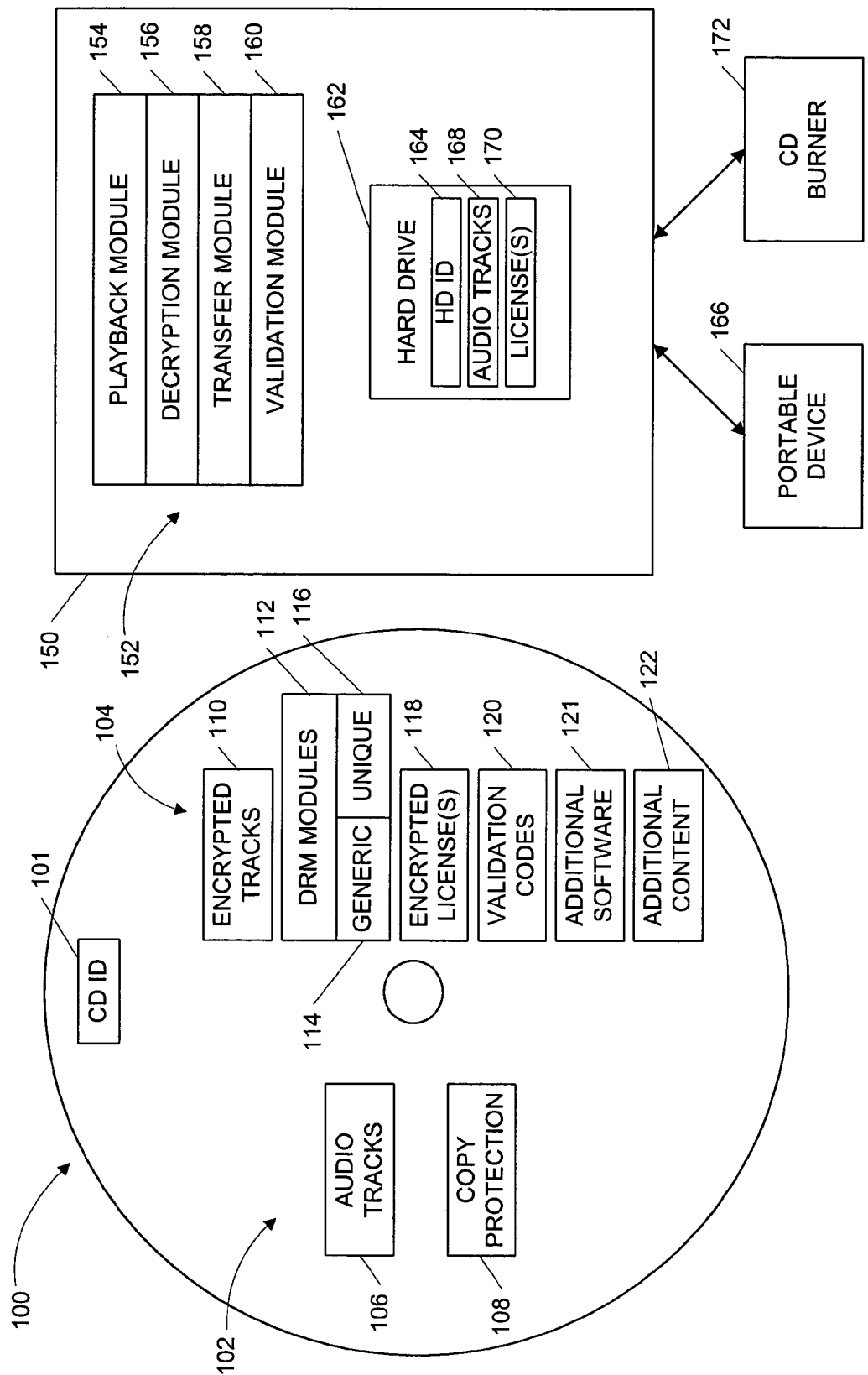
FIG. 1 is a block diagram illustrating a protected compact disc and a computer with installed digital rights management software connected to external devices.

FIG. 1 is a block diagram depicting the contents, in one embodiment, of a protected compact disc 100 containing audio data and the components, in one embodiment, of a client computer 150 containing software allowing storage and playback of protected audio data, in addition to transfer to a portable device 166. In other embodiments, other forms of media may be used instead of a compact disc while incorporating inventive aspects, including, but not limited to compact disc-recordable ("CD-R"), compact disc-rewrittable ("CD-RW"), digital versatile disc or digital video disc ("DVD"), DVD-Recordable ("DVD-R" or "DVD+R"), DVD-rewrittable ("DVD-RW" or "DVD+RW"), DVD-random access memory ("DVD-RAM"), Minidisc®, or various forms of optical and/or digital media. In another embodiment, the media contains digital video data rather than digital audio data.

In the illustrated embodiment, the protected compact disc 100 contains two "sessions," meaning separate readable sections of data. Of course, the separate sections do not need to be separate in a physical sense (as in each complete section being stored in a separate, discrete, or distinct part of the storage media), but rather may be separate in a logical sense (as in two distinct sets of related data). In the illustrated embodiment, the protected compact disc may contain a first session 102, an audio content session, which is designed to hold audio data 106 readable by traditional audio compact disc players. In one embodiment, this session may comport to the Redbook compact disc standard, developed in 1982 by Philips and Sony to hold audio content. Also in the illustrated embodiment, the protected compact disc 100 may contain a second session 104, which is designed to hold computer data and be read by a CD-ROM drive, for example. In one embodiment, this session may comport to the Yellowbook compact disc standard, developed in 1984 by Philips and Sony to hold general data and be read by a CD-ROM drive. By having two sessions, one readable by a traditional audio player and one readable by a computer, the protected compact disc provides a wide range of uses. In an alternative embodiment, the protected compact disc 100 contains only one of the two sessions illustrated, although this will necessarily reduce the number of applications with which the protected compact disc can be used. In yet another embodiment, the protected compact disc 100 contains more than two sessions. One example of a protected compact disc 100 with more than two sessions would be a compact disc comprising an audio session, a data session with Windows® software on it, and another data session with Macintosh® software.

In one embodiment, the audio content session 102 contains audio tracks 106, which hold the audio content for which the compact disc is purchased. In another embodiment, the audio data is not divided into separate tracks, but rather is a single undivided piece of audio data. In various embodiments, the illustrated copy protection 108 comprises any one or more of the understood methods of preventing a computer CD-ROM drive from being able to read the audio tracks 106. Examples of copy protection systems include, but are not limited to: the CDS System produced by Macrovision Corporation of Santa Clara, Calif., USA, MediaCloq by SunnComm Technologies, Inc., of Phoenix, Ariz., USA, and XCP1 Burn Protect and XCP2 Press Protect by First 4 Internet Ltd. of Oxfordshire, United Kingdom. The use of copy protection on the audio content session is important to the proper functioning of the protected compact disc 100, because without the use of copy protection, unauthorized users will be able to access the audio content contained on that session. Although the disc in the illustrated embodiment shows copy protection separated from the audio tracks, in one embodiment the copy protection may be integrated into the audio tracks themselves.

In the illustrated embodiment, the data session 104 contains encrypted audio tracks 110. In another embodiment, the encrypted audio data may not be separated into tracks. In addition, in one embodiment the data session 104 contains digital rights management software modules 112, or DRM (Digital Rights management) modules 112. As will be illustrated in the discussion below, DRM modules 112 contain software that determines whether particular types of access to the encrypted tracks 110 may be allowed and decrypts the tracks to facilitate allowed access. In one embodiment, the DRM modules 112 contain the one or more of the software modules described below with respect to management software 152. In another embodiment, the DRM modules 112 also contain decryption keys so that the modules can decrypt the encrypted tracks 110. In yet another embodiment, the DRM modules 112 have been modified so as to be tamper-resistant. One such process for making a tamper-resistant DRM module 112 is described in U.S. patent application Ser. No. 09/552,951 filed Apr. 20, 2000, which is in herein incorporated by reference in its entirety.

In one embodiment, there are two DRM modules, a generic module 114, may be used for all protected compact discs, and a unique module 116. The use of two separate modules can be beneficial in that it increases the work required to access the encrypted audio content over that required if only one module were used. The use of a unique DRM module 116, that is one that is not used on every protected compact disc, may increase security by preventing an authorized user from discovering the encryption keys and algorithms of one protected disc and then using that information to gain access to the encrypted data on every protected compact disc. Additionally, the use of a generic module 114 saves computing resources by allowing manufacturers to use shorter encryption keys to create the unique DRM modules 116 than would be necessary for adequate protection if the unique DRM module 116 were the only one used on the compact disc. In one embodiment, the unique module 116 is unique to one particular album; in another embodiment, the unique module 116 is unique only for each recording company that chooses to make protected discs. The particular granularity of the uniqueness of the unique DRM module may be modified without affecting other inventive aspects of the methods described herein. The DRM modules 114 and 116 may comprise pairs of encryption and decryption keys for additional protection of the data. These encryption and decryption pairs will be referred to here as protection encryption/decryption keys.

In the illustrated embodiment, the data session 104 also contains one or more separately encrypted licenses 118. In one embodiment the license 118 may contain descriptions of allowed uses for the audio content on the compact disc. The use of encryption on the license 118 is important in addition to the use of encryption for the audio tracks, as an unauthorized user could otherwise create a new license providing unlimited access to the encrypted audio tracks 110, and thus thwarting the compact disc protection. The use of the encrypted license 118 will be described in further detail below. In another embodiment, this license encrypted and stored inside a DRM module rather than being stored separately. In one embodiment, the data session 104 also contains validation codes 120, which may be used to verify that DRM and playback software have not been tampered with. One exemplary method of validating software will be described in greater detail below. In some embodiments, the data session 104 also contains additional software 121. In one embodiment, this software may contain playback interfaces for the encrypted tracks. In another embodiment, this software may contain software used to transfer tracks to a portable electronic or computing device. In yet another embodiment, this software may contain software to allow tracks to be burned to a writable compact disc. In one embodiment, the additional software 121, as well as the DRM modules 112, can comprise multiple versions which can be executed on multiple types of computers, electronic devices, server or client computing devices, as is described below.

In one embodiment, the data session 104 may contain additional content 122. The additional content 122 is versatile; in one embodiment this additional content is video content; in another embodiment it is a link to a Web page related to the audio data. Finally, in one embodiment, the protected compact disc 100 may contain an identifier 101. In one embodiment, the identifier 101 may be written to the disc in such a way that it cannot be copied if the contents of the protected compact disc 100 are copied and burned to another compact disc. Examples of this technology can be found in systems provided by Macrovision, SunnComm, and First 4 Internet Ltd. In one embodiment, identifier 101 is unique to every compact disc made and serves to support a mechanism, described below, whereby a copy of a compact disc cannot be accessed as well as the original disc, if at all. In another embodiment, the identifier 101 is not necessarily unique, but is chosen from a large enough sample that the likelihood of two discs having the same identifier is very small.

One embodiment of the invention comprises the storage of protected audio 168, as well as management software 152 on the client personal computer 150 of a user, referred to here as a client computer or user computer 150, of the protected compact disc 100. In another embodiment, a portable device 166 is directly connected to the client computer 150 or coupled via a wireless, telecommunication, local area, or wide area network in order to allow for the storage and playback of the protected audio content 108 or 110 on the portable device 166. In addition, in one embodiment, a compact disc burner 172 may be connected to the client computer 150 in order to allow for the creation of new audio compact discs. In one embodiment of the invention, the management software 152 is stored on the protected compact disc 100, and is copied to the client computer 150 in order to access protected audio 108 or 110. In one embodiment, the management software 152 is stored on the client computer hard drive 162. In another embodiment, the management software 152 is stored and executed from the random access memory ("RAM", not shown) of the client computer 150. The client computer 150 may include a conventional general purpose single- or multi-chip microprocessor (not shown), including but not limited to, a Pentium® processor, Pentium II® processor, Pentium III® processor, Pentium IV® processor, Pentium® Pro processor, a 8051 processor, a MPS® processor, a Power PC® processor, or an ALPHA® processor. In addition, the microprocessor may be any conventional special purpose microprocessor such as a digital signal processor. In addition, the client computer 150 may include a general operating system, including but not limited to the Windows® operating system, the Macintosh® operating system, or Linux operating system. Indeed, in one embodiment of the invention, the protected compact disc 100 may store multiple versions of the management software 152 in order that it may be installed on computers with different operating systems or using different processors.

In one embodiment, the management software 152 may comprise a plurality of software modules 154, 156, 158, and 160. The software modules represented in management software 152 comprise only one embodiment of the management software 152 that can be installed on a client computer 150 in accordance with the present invention. In alternative embodiments, the modules can be combined into fewer modules or partitioned into more modules than are illustrated in FIG. 1. Specific examples of alternative embodiments of these modules will be described below. In one embodiment the modules represent dynamically linked libraries; in an alternative embodiment the modules represent separate software applications. In yet another embodiment a combination of individual applications and libraries is used.

In the illustrated embodiment, the management software 152 comprises, among other modules, a playback module 154, a decryption module 156, a transfer module 158, and a validation module 160. In one embodiment, the playback module 154 can be a software module configured to present an interface to a user for playback of protected audio stored either on the protected compact disc 100 or the client computer 150. The processes for playback will be described in greater detail below. In one embodiment the decryption module 156 can be a software module configured to decrypt encrypted audio when raw unprotected audio data is needed, such as during playback or transfer to a portable device. The processes for decryption of protected audio content will described in greater detail below. In one embodiment, the transfer module 158 can be a software module configured to securely transfer audio content to the portable device 166 that is attached to the client computer 150. The processes for transfer of protected audio content will described in greater detail below. In one embodiment, the validation module 160 can be a software module configured to validate specific software modules which manage the protected audio content, and to ensure that those modules have not been tampered with or replaced by other software, thus helping to ensure that the protected audio content is not in danger of being copied or transferred in violation of its allowed uses. In an alternative embodiment, the validation module exists not as a separate module, but instead as multiple copies, each incorporated with a software component in order to allow that component to validate the other components it interacts with.

As mentioned above, in one embodiment, the client computer 150 may comprise a hard drive 162. In one embodiment, this hard drive is stored internally, in another the hard drive is an external hard drive. Additionally, alternative embodiments include removable forms of media, including, but not limited to zip diskettes and solid-state USB drives, or remote storage, such as a networked file server. For the ease of nomenclature, but not by way of limitation, future reference to storage associated with the client computer 150 will refer to hard drive 162.

In one embodiment, protected audio data 168 is stored on hard drive 162. In one embodiment of the invention, the audio data 168 is stored on the hard drive 162 through a copying process, as described below. Also, in one embodiment, the audio data 168 is protected in accordance with the methods described below. In one embodiment of the invention, an hard drive identifier 164 is stored on the hard drive 162. The identifier 162 is used to serve a purpose similar to the compact disc identifier 101 described above. In an alternative embodiment, the identifier 164 is not stored on the hard drive 162 itself, but it is instead generated each time it is needed from system parameters. In yet another embodiment, the identifier 164 is the physical serial number of the hard drive 162. The mechanisms of the use of the identifier 164 will be described below. Finally, in one embodiment, the hard drive 162 may also contain one or more digital rights management software licenses 170, which describe the allowed uses of particular pieces of audio data. Similarly to the management software above, in one embodiment the licenses 170 are copied from a protected compact disc 100 and stored on the hard drive 162 in order to protect copied audio data 168.

Figure 2:
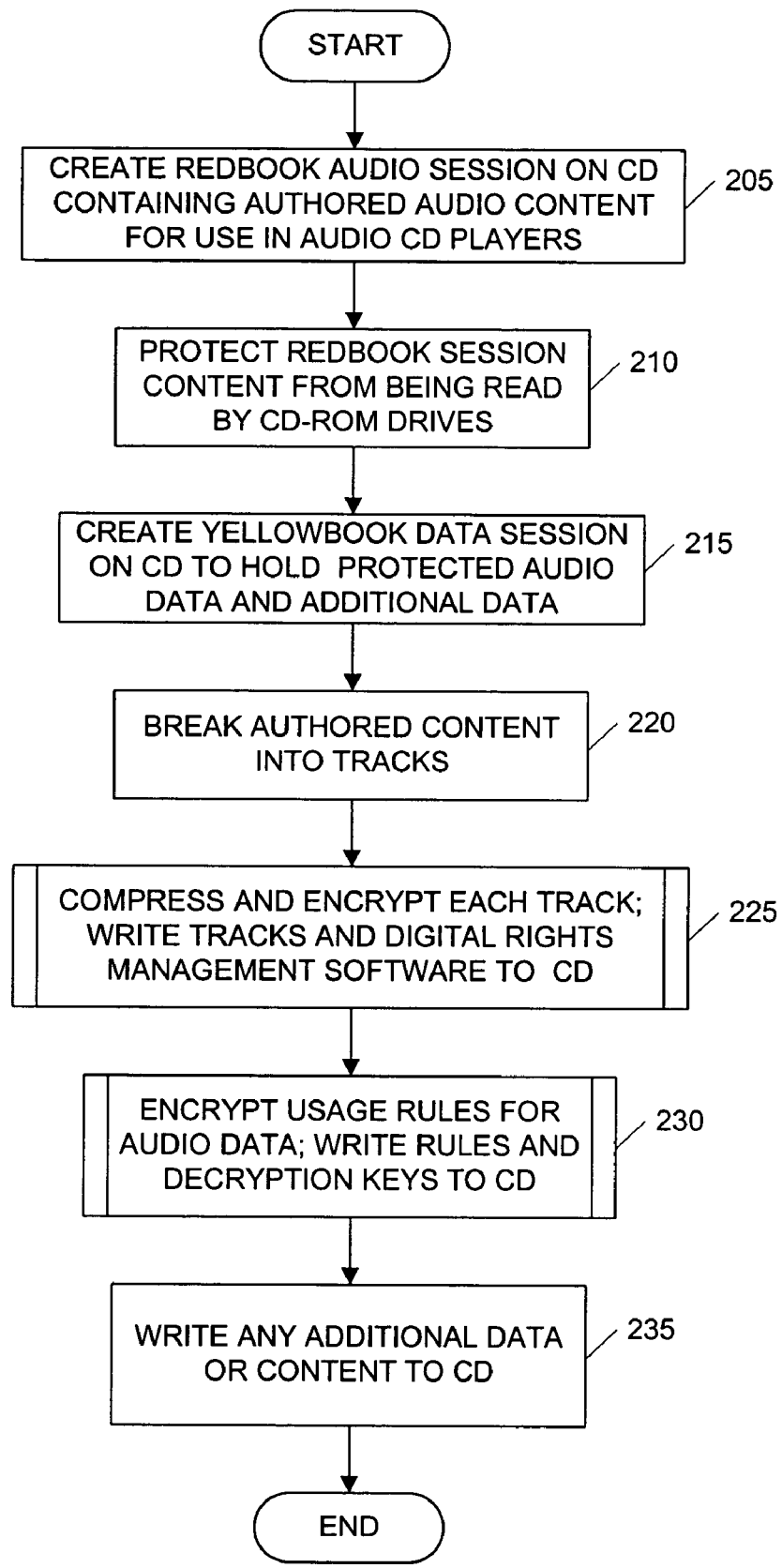
FIG. 2 is a flowchart illustrating, in one embodiment of the invention, a process that is performed by the manufacturer of the protected compact disc of FIG. 1 for creating a protected compact disc.

In FIG. 2 there is shown a flowchart illustrating an exemplary process through which a compact disc manufacturer creates a protected compact disc 100. Depending on the embodiment, additional steps may be added, others removed, selected steps merged, and the ordering of the steps rearranged. Starting at a step 205, a Redbook, or digital audio content, session 102 is created on the protected compact disc 100, and has authored audio content written to it, so that the protected compact disc can be played in audio compact disc players. The digital audio data may be retrieved off of a local drive, or may be downloaded or streamed from a remote server via a communication link or network. In one embodiment, the protected compact disc 100 is sold as an album of musical tracks, akin to the way traditional audio compact discs are sold. In another embodiment, the authored audio content may comprise one single file. By creating the Redbook session 102, the protected compact disc 100 can be purchased and used like any traditional compact disc, with any content protection being transparent to a user if he or she only plays the disc on a traditional audio compact disc player. Continuing to a step 210, the Redbook session 102 has technology added to it that prevents that session from being read by a CD-ROM drive. As mentioned above, methods of protecting audio content sessions from being read on CD-ROM drives are known in the art and are offered by multiple manufacturers.

Next, at a step 215, a Yellowbook, or data, session 104 is created on the protected compact disc 100. This is done to allow the protected compact disc 100 to hold additional data, such as the encrypted audio files and software which will allow the protected content to be accessed on the client computer 150. As mentioned above, the use of separate audio and data sessions on the protected compact disc 100 allows for a versatile compact disc 100 that can be used in either audio compact disc players or in computer CD-ROM players, with the difference being as transparent as possible to the user. After creating a data session 104 on the compact disc 100, the process continues to a step 220, where the authored content that was written to the audio content session 102 in step 205 is broken into individual tracks, or files of audio content which can be played separately. While this step is not included in the process illustrated in FIG. 2, it is a useful step in that, by breaking the content into tracks, any later decryption may be easier to perform. In addition, because most albums are sold as comprising a plurality of separate songs, partitioning the content into tracks provides a purchaser of the protected compact disc 100 a similar level of access to the disc as he or she would be able to have on a traditional audio compact disc player.

Continuing to a step 225, each track is compressed, encrypted, and written to the data session 104 on the protected compact disc 100. Additionally, in one embodiment, any necessary digital rights management software is written to the disc at this time. This process will described in greater detail below in the discussion with respect to FIG. 3. After the tracks are written, in a step 230 any usage rules for the encrypted data 104 are encrypted, and these rules and any decryption keys necessary for obtaining access to the rules are written to the disc. This process will described in greater detail below in the discussion with respect to FIG. 5. Finally, continuing to a step 235, any additional data 122 that the manufacturer desires to be on the protected disc 100 is written. In one embodiment, this includes video files. In another this additional data includes games or hyperlinks to networked resources that may be of interest to purchasers of the protected compact disc 100.

Figure 3:
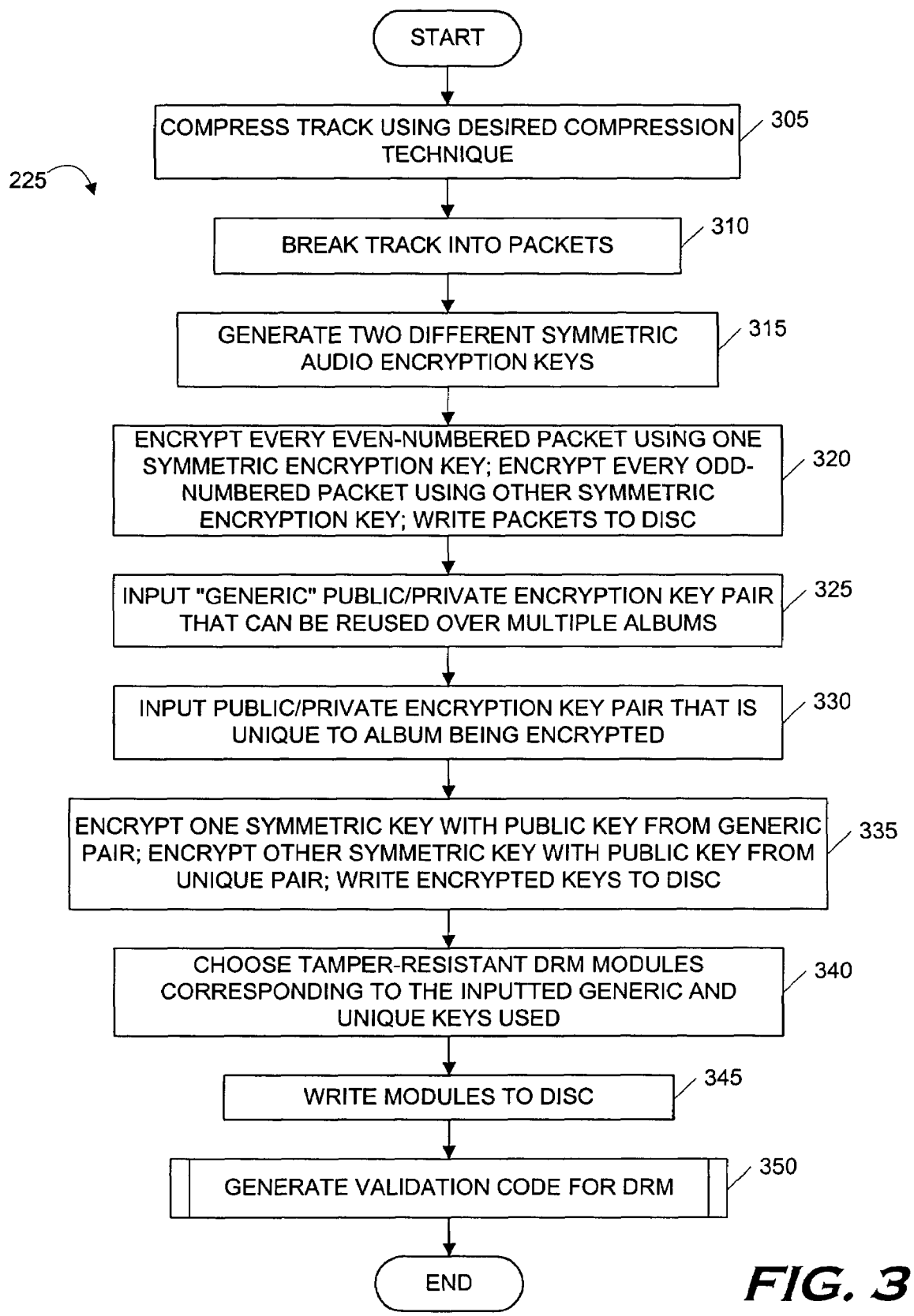
FIG. 3 is a flowchart illustrating, in one embodiment of the invention, a process that is performed by the manufacturer of the protected compact disc of FIG. 1 for writing encrypted audio data to a compact disc.

In FIG. 3 there is shown a flowchart illustrating an exemplary process 225 through which the process of FIG. 2 compresses, encrypts, and writes an encrypted track to the protected compact disc 100. The process illustrated in FIG. 3 corresponds to step 225 of FIG. 2. Depending on the embodiment, additional steps may be added, others removed, selected steps merged, and the ordering of the steps rearranged. For clarity, the illustrated embodiment shows only the process being performed on a single track. However, the process 225 is extendable to a plurality of tracks while retaining the inventive aspects. Starting at a step 305, a track of musical data is compressed for inclusion on the disc 100. No one particular method of compression is necessary for the use of the present invention and the method chosen may be one of, but is not limited to the methods used to create the Motion Picture Experts Group 1-Level 3 audio format (commonly known as MP3), the RealAudio® format, the Windows Media® format, Advanced Audio Coding (AAC) format, the .wav format, or others. Once the track has been compressed, the process continues to a step 310 where the track is broken into packets. The use of individual packets to represent compressed audio is well known, and, depending on the method of compression chosen in step 305, may be done by the compression technique. This partitioning into packets is performed in step 310 in order to provide for better content protection, as will be seen in the following steps.

In one embodiment the track is encrypted by encrypting each individual packet. In one embodiment, two different encryption keys are used to encrypt the packets so that one key is used on every other packet and the other key is used on the packets in between. Thus, in one embodiment, the process 225 ensures that no two adjacent packets will be encrypted with the same key. This is a useful technique in that it requires an unauthorized copier to find the decryption keys associated with each of the two encryption keys, which increases the effort and resources required of the copier. Continuing from step 310, this part of the process begins in a step 315, where, in one embodiment, two different symmetric encryption keys are generated. In another embodiment, in step 315 a different number of audio encryption keys are created. A tradeoff is involved when selecting the number of audio encryption keys; the more keys that are generated in step 315, the higher the security of the encrypted audio will be, but this will have a cost as more keys will require more storage space on the protected compact disc 100 and more computing resources at both encryption and decryption time. Additionally, in an alternative embodiment, the keys generated in step 315 are not symmetric, but represent an asymmetric encryption key pair.

Continuing to a step 320, the track is encrypted. In the illustrated embodiment, two keys have been generated in step 315, and so those are alternatively used to encrypt every packet of the track in time-order. Thus, if the tracks were to be numbered in time-order, the even-numbered packets would be encrypted by one of the keys generated in step 315 and the odd-numbered packets would be encrypted by the other key generated in step 315. In another embodiment of step 320, a different encryption technique is used depending on the number of keys generated in step 315 or if a different order is desired by the disc manufacturer. Finally in step 320, after every packet of the track is encrypted, the encrypted packets are written to the compact disc 100. In an alternate embodiment, packets are written to the compact disc 100 as they are encrypted.

Next, at a step 325, the disc manufacturer inputs a public/private encryption key pair that is used over multiple albums, otherwise known as the "generic" key pair 114. Continuing to a step 330, a public/private key pair 116 is input that is unique to the particular album for which the protected compact disc 100 is being created; this is known as the "unique" key pair 116. In another embodiment, the keys input at steps 325 and 330 are created at the time of compact disc creation. In an alternate embodiment, the keys input at steps 325 and 330 are not public/private key pairs but instead are symmetric keys. Next, at a step 335, the two symmetric audio encryption keys generated at step 315 are themselves encrypted, one by the generic public key and one by the unique public key, protecting the audio encryption keys from being read. These newly-encrypted keys are then written to the protected compact disc 100. As discussed above, the use of one key pair that is generic over all albums and one that is unique to the particular album is done in order to affect a trade off between computing resources and storage space on one hand and data security on the other hand. In an alternate embodiment, a different number of key pairs other than two may be created, although it is preferable to utilize the same number as the number of keys generated at step 315, so that every key generated in that step can be individually protected, thereby increasing key security.

Continuing to a step 340, the manufacturer chooses tamper-resistant digital rights management modules corresponding to the key pairs input in steps 325 and 330. In one embodiment, a DRM module corresponds to an input key pair by containing the private key of the pair in a decryption submodule. Thus, the DRM module can decrypt data that has been encrypted with the public key of the pair that DRM module is associated with. One embodiment of the method of associating, and hiding, a decryption key in a software module can be found in the U.S. patent application Ser. No. 10/075,471 filed on Feb. 13, 2002, which is herein incorporated by reference in its entirety. Next at a state 345, the DRM modules are written to the protected compact disc 100, and finally, in a step 350 a validation code is generated for the DRM. The process of generating validation codes can be found below in the discussion with respect to FIG. 4.

Figure 4:
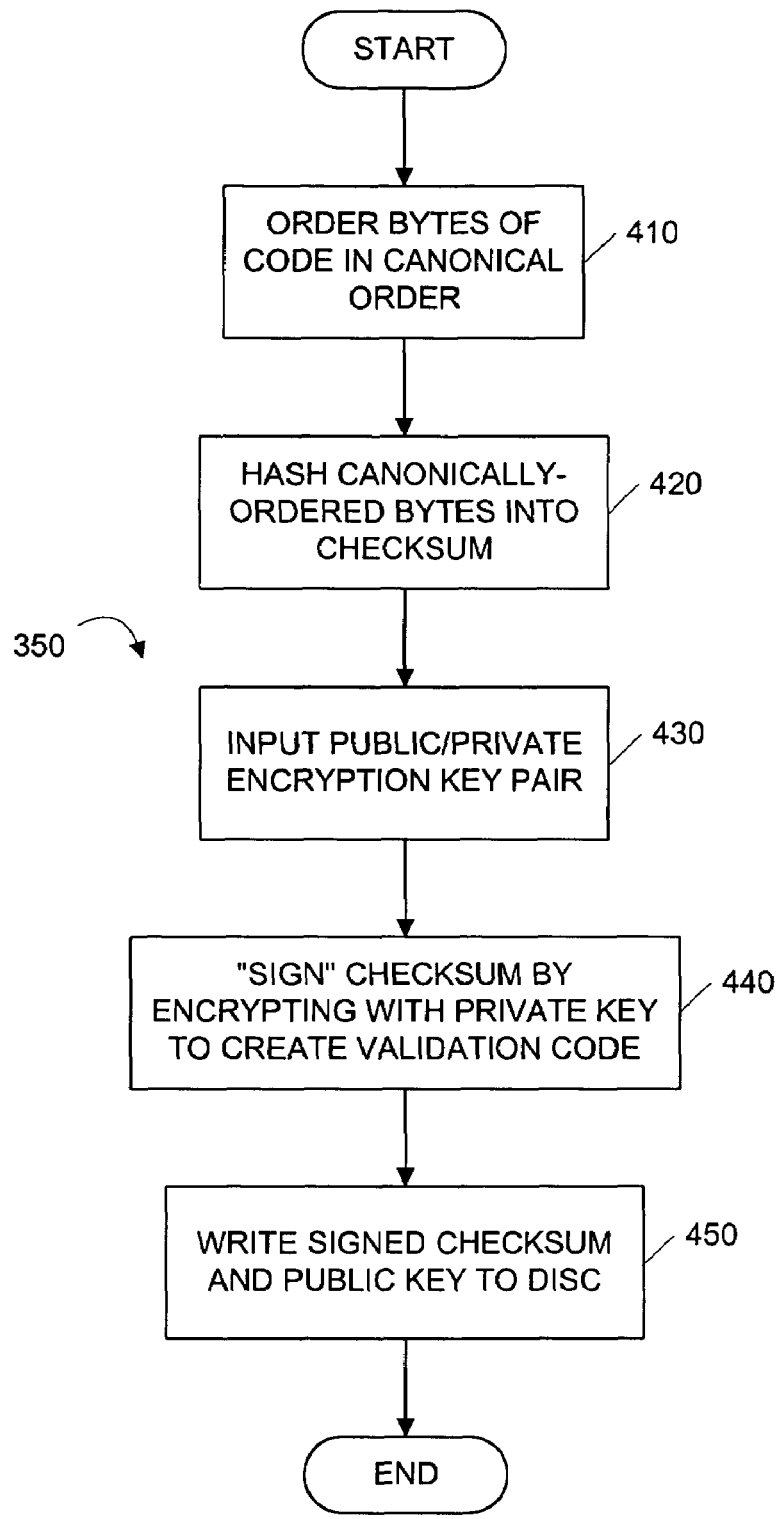
FIG. 4 is a flowchart illustrating, in one embodiment of the invention, a process that is performed by the manufacturer of the protected compact disc of FIG. 1 for creating a validation code for computer code that is stored on a compact disc.

In FIG. 4 there is shown a flowchart illustrating an exemplary process 350 through which the process of FIG. 3 may create a validation code for a given software module. The process described in FIG. 4 corresponds to step 350 of FIG. 3. Depending on the embodiment, additional steps may be added, others removed, selected steps merged, and the ordering of the steps rearranged. In one embodiment, the process 350 is done on any and all software that manipulates the protected audio data, for example if it is meant to manipulate the audio data in an unencrypted state. By creating a validation code and including it along with the software that must be trusted, a computer running the management software 152 can help ensure that no software has been tampered with or replaced. For clarity, the process 350 is described with reference to a single software module. In another embodiment, the process 350 creates validation codes for combinations of modules. In yet another embodiment, the process 350 creates validation codes for individual library calls in dynamically linked libraries. The process 350 starts at a step 410, where the bytes of the software module are arranged in canonical order. In this context, the use of the term canonical means merely any well-established ordering or pattern of software bytes independent of any particular ordering that the software bytes may take in a computer memory or in storage. Thus, the exact method of ordering the bytes is unimportant, but by ordering the bytes according to an established pattern a stable ordering of the code is provided, allowing for easier validation.

Continuing to a step 420, the manufacturer of the protected compact disc 100 then uses a hashing algorithm to hash the canonically-ordered bytes of code to create a checksum. The exact method of hashing is unimportant, as long as the likelihood of two different pieces of code hashing to the same checksum is relatively low. Continuing to a step 430, a public/private encryption key pair is input in order to protect the checksum. In one embodiment this key pair is one of the key pairs input in steps 325 and 330 in FIG. 3. In another embodiment this is a distinct key pair. Next, in a step 440, the checksum is digitally signed by encrypting it with the private key of the public/private key pair. By signing the checksum, its authenticity can be ensured when it is later decrypted. Finally, at a step 450 the signed checksum and the public key of the key pair input in step 430 are written to the disc 100. In one embodiment, the signed checksum and public key are written together to the disc 100. In another embodiment, each checksum is incorporated into the software module to which is corresponds. In yet another embodiment, the public key is contained in a separate validation software module.

Figure 5:
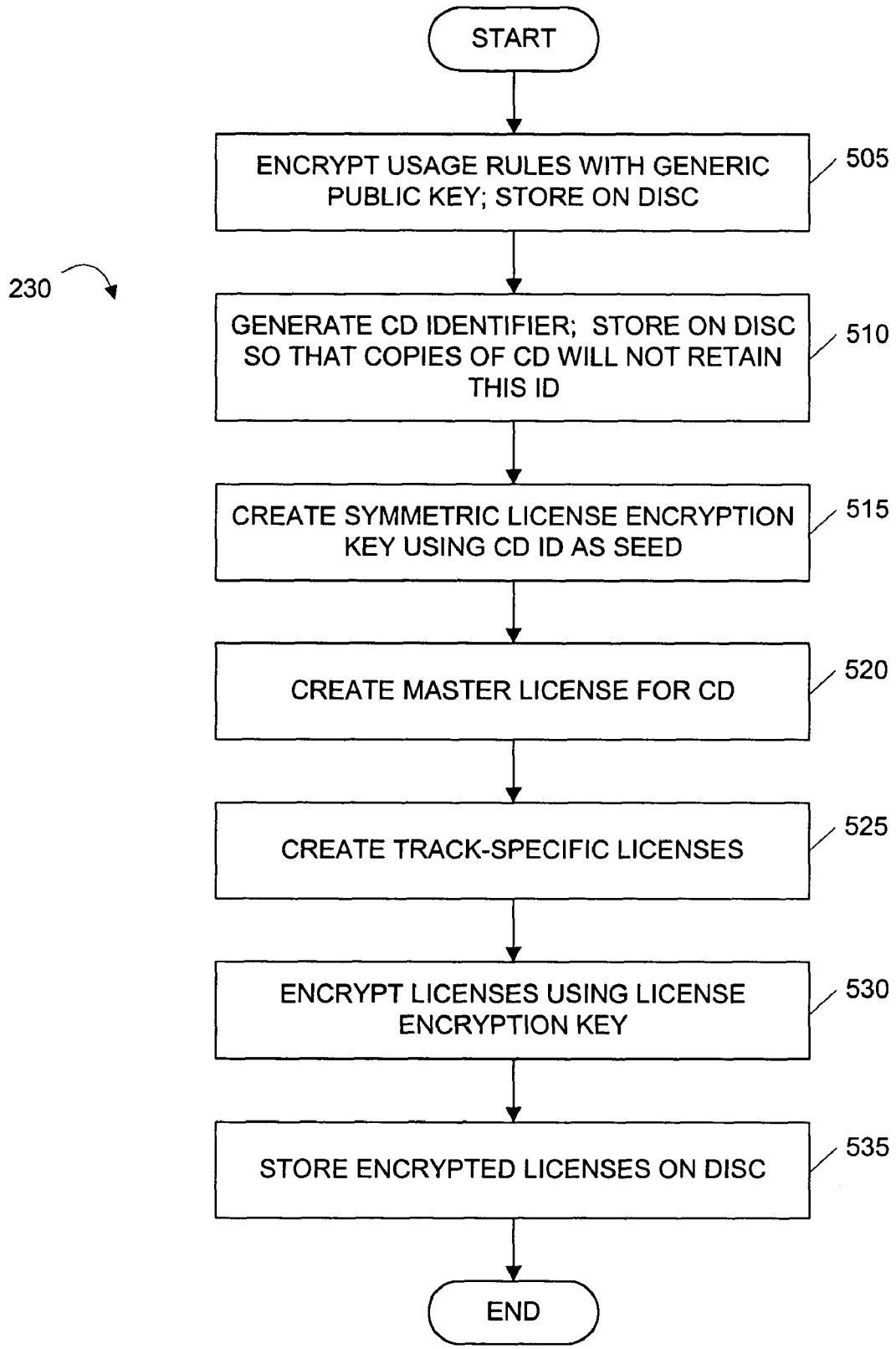
FIG. 5 is a flowchart illustrating, in one embodiment of the invention, a process that is performed by the manufacturer of the protected compact disc of FIG. 1 for writing protected digital rights management licenses to a compact disc.

In FIG. 5 there is shown a flowchart illustrating an exemplary process 230 through which the process of FIG. 2 can encrypt usage rules for the protected data and writes these rules to the protected compact disc 100. The process 230 described in FIG. 5 corresponds to step 230 of FIG. 3. Depending on the embodiment, additional steps may be added, others removed, selected steps merged, and the ordering of the steps rearranged. Starting at a step 505, usage rules describing types of access that are or are not allowed are encrypted with the generic public key and stored on the disc 100. In one embodiment, these rules are stored separately; in another embodiment, they are incorporated into the generic DRM module before it is written to the disc 100. Next, at a step 510, the compact disc identifier 101 is created for the protected compact disc 100 and stored so that it cannot be duplicated to a new compact disc even if the entirety of the data on compact disc 100 is copied. The technology used to create the identifier 101 is described above in the discussion with respect to FIG. 1. Continuing to a step 515, a symmetric license encryption key is created using the compact disc identifier 101 as a seed. Then, at a step 520, a master license is created for the compact disc, and at a step 525, track-specific licenses 118 are created. In one embodiment, the licenses 118 may describe acceptable uses for various tracks on the disc 100, or for all of them. In another embodiment, different levels of licenses 118 are created so that album-level and track-level rules can be implemented. As an example, and not by way of limitation, a protected compact disc track license 118 might describe that the second track on the album may be stored on a hard drive, while an album-level license 118 might allow the burning of any three tracks from the album onto another compact disc, but no more. In one embodiment, the manufacturer decides the particular uses granted by the licenses 188 before creating the protected compact disc 100.

Continuing to a step 530, the licenses 118 are encrypted with the license encryption key and then, at a step 535, the encrypted licenses 118 are written to the compact disc 100. This, in effect, binds the licenses 118 to the particular compact disc 100. The licenses 118 are prevented from being copied, at least in encrypted form, to another protected compact disc, as that disc will not likely have the same identifier. As will be described below, this method of encryption requires that the same "binding ID" be present so that the licenses 118 can be decrypted and read when access is requested. Note that this is not the only way of binding the licenses 118. In an alternate embodiment, the licenses 118 are encrypted with the generic key pair of step 325 along with the binding ID. In this embodiment, the management software 152 is configured so that the binding ID on the disc 100 is checked against the one that was encrypted with the license at execution time, and access is allowed only if the IDs match. In either case, the use of the compact disc identifier 101 along with the licenses 118 is yet another feature of the invention adding to the overall security of the content stored in the disc 101. With the completion of FIG. 5, the exemplary process of protected compact disc manufacture is described. The following figures demonstrate the uses of the protected compact disc 100 after manufacture and purchase by a consumer.

Figure 6:
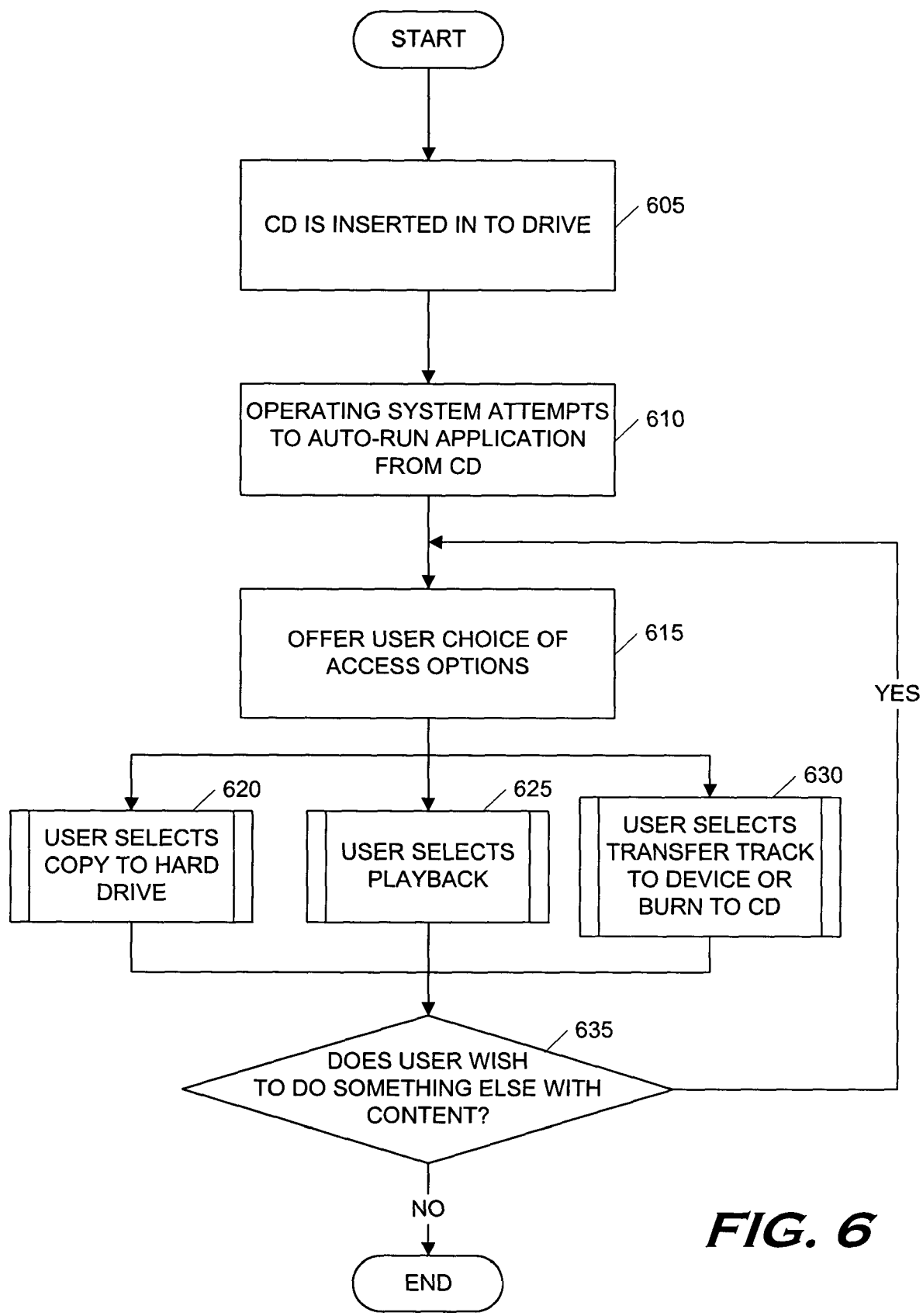
FIG. 6 is a flowchart illustrating, in one embodiment of the invention, a process that is performed by a user's computer when the protected compact disc of FIG. 1 is inserted into the CD-ROM drive.

In FIG. 6 there is shown a flowchart illustrating an exemplary process that occurs when the protected compact disc 100 is placed in a client computer 150 with the intent of accessing the audio content 106 contained on the disc 100. Depending on the embodiment, additional steps may be added, others removed, selected steps merged, and the ordering of the steps rearranged. Starting at a step 605, the protected compact disc 100 is inserted into the CD-ROM drive of client computer 150. Next, at step 610, the operating system attempts to auto-run an application contained on the protected compact disc 100. In an alternate embodiment, the client computer 150 does not contain auto-run software, or such software is deactivated, and no auto-run step is performed. In one embodiment, in the case that auto-run of the application on the compact disc 100 does not occur, the user would be required to run a management application from the compact disc itself in order to access the audio content contained therein.

In either case, continuing to a step 615, the user is offered a choice of access options. Three of these options are illustrated, although other embodiments may include additional options while incorporating inventive aspects. At a step 620, the user selects copying the audio content to the hard drive of the client computer 150. At a step 625, the user selects playing the audio content contained 106 on the protected compact disc 100. At a step 630, the user selects transferring one or more tracks 110 to a portable device 166 or burn one or more tracks to a writable compact disc. Each of these steps will be described in greater detail below. Finally, after one of the steps 620, 625, or 630 completes, the client computer 150 determines at a decision step 635 whether the user wants to perform an additional task with the content. If so, the client computer 150 returns to step 615 to offer options to the user. If not, the process ends.

Figure 7:
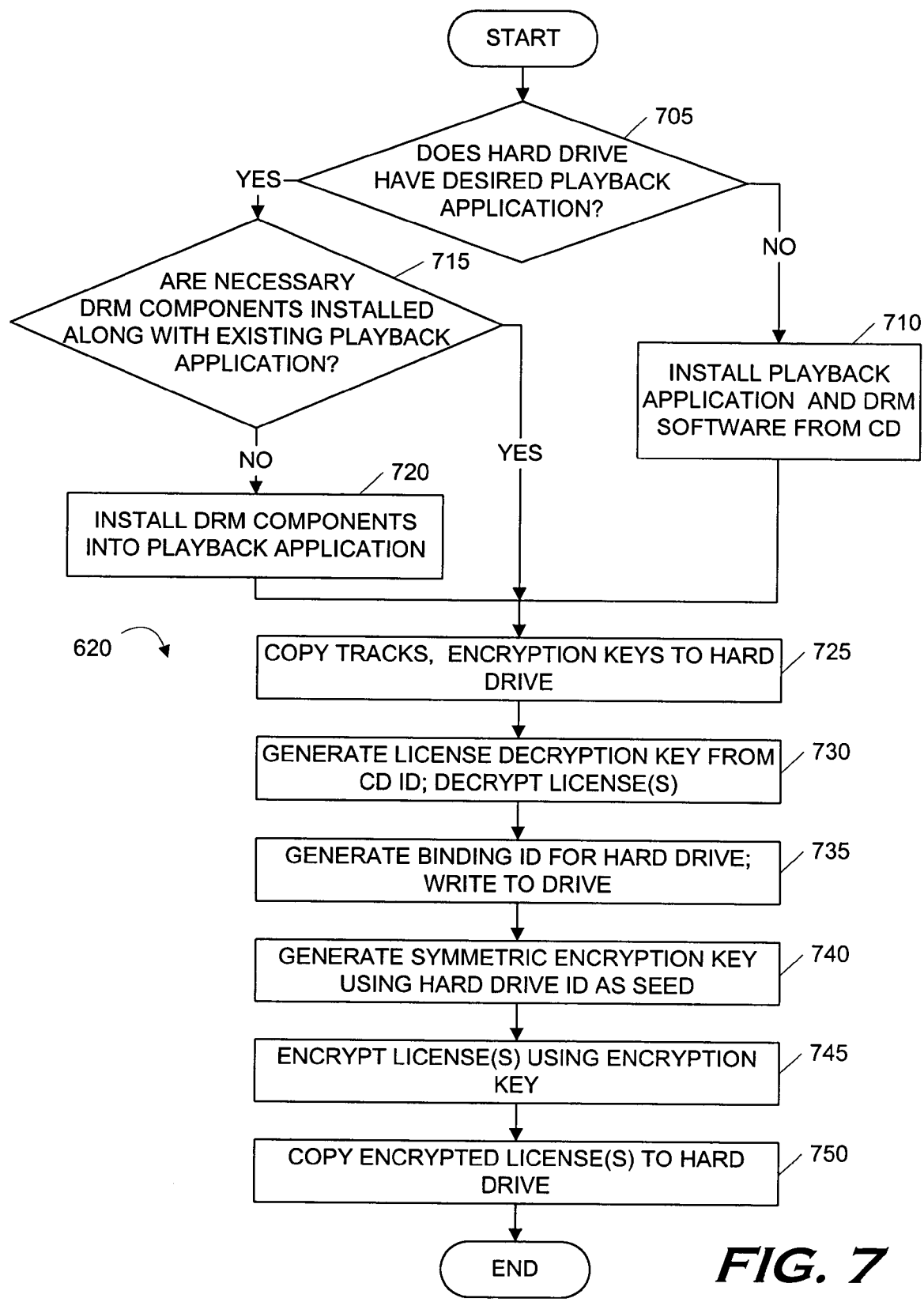
FIG. 7 is a flowchart illustrating, in one embodiment of the invention, a process that is performed by a user's computer when the user elects to copy audio tracks from the protected compact disc of FIG. 1 to the computer's hard drive.

In FIG. 7 there is shown a flowchart illustrating an exemplary process 620 that can be used when the user elects to copy tracks off of the protected compact disc 100 to the hard drive 162. The process described in FIG. 7 corresponds to step 620 of FIG. 6. Depending on the embodiment, additional steps may be added, others removed, selected steps merged, and the ordering of the steps rearranged. Starting at a decision step 705, the client computer 150 determines if the hard drive 162 contains a playback application that will be able to decrypt and protect the audio that will be copied to the hard drive 162. In an alternate embodiment, this step is not performed and the tracks are copied without regard to future protection. However, omitting this check would limit the security features of the invention. If the computer determines that no playback application is present on the hard drive 162, then at a step 710 the computer installs a playback application and digital rights management software on the hard drive 162 from the compact disc 100 and continues to a step 725. If the client computer 150 determines that the playback application is installed on the hard drive 162, then at a decision step 715 the client computer 150 determines whether the necessary digital rights management software components are installed in the playback application 154. If the components are not installed, the client computer 150 continues to a step 720 where the components are installed.

Once the components are installed, or if they were previously installed, the client computer 150 proceeds to step 725, where the encrypted tracks 110 and any separate encryption keys are copied to the hard drive 162. Next, at a step 730, a license decryption key is generated from the compact disc identifier 101 and this is used to decrypt the encrypted licenses 118 on the compact disc 100. In the alternative embodiment discussed above where the licenses 118 were not encrypted with a key made from the compact disc identifier 101, the licenses 118 are decrypted along with the encrypted identifier, which is compared to the one contained on the compact disc 110. In one embodiment, if the binding ID cannot be verified through means such as those just described, the process 620 ends immediately, and the licenses 118 are not copied to the hard drive 162. Next the client computer 150 continues to a step 735 where a binding hard drive identifier 164 is created and stored on the hard drive 162, as was discussed above in the discussion with respect to FIG. 1. In an alternate embodiment, the identifier 164 is never stored on the hard drive 162, but rather is created anew every time it is needed using predetermined parameters of the client computer 150. In yet another embodiment, the identifier 164 is the physical serial number of the hard drive 166. Then, at a step 740, the client computer 150 generates a symmetric encryption key using the new hard drive identifier as a seed, and then the license or licenses are encrypted with the newly-created encryption key at a step 745 and copied to the hard drive 162 at a step 750. This is done in a similar fashion to the storage of the licenses 118 on the protected compact disc 100 in FIG. 5. In an alternate embodiment, the licenses 170 are encrypted with another key, such as the generic key from step 325, along with the hard drive identifier 164, similarly to the alternate embodiment discussed above with respect to FIG. 3.

Figure 8:
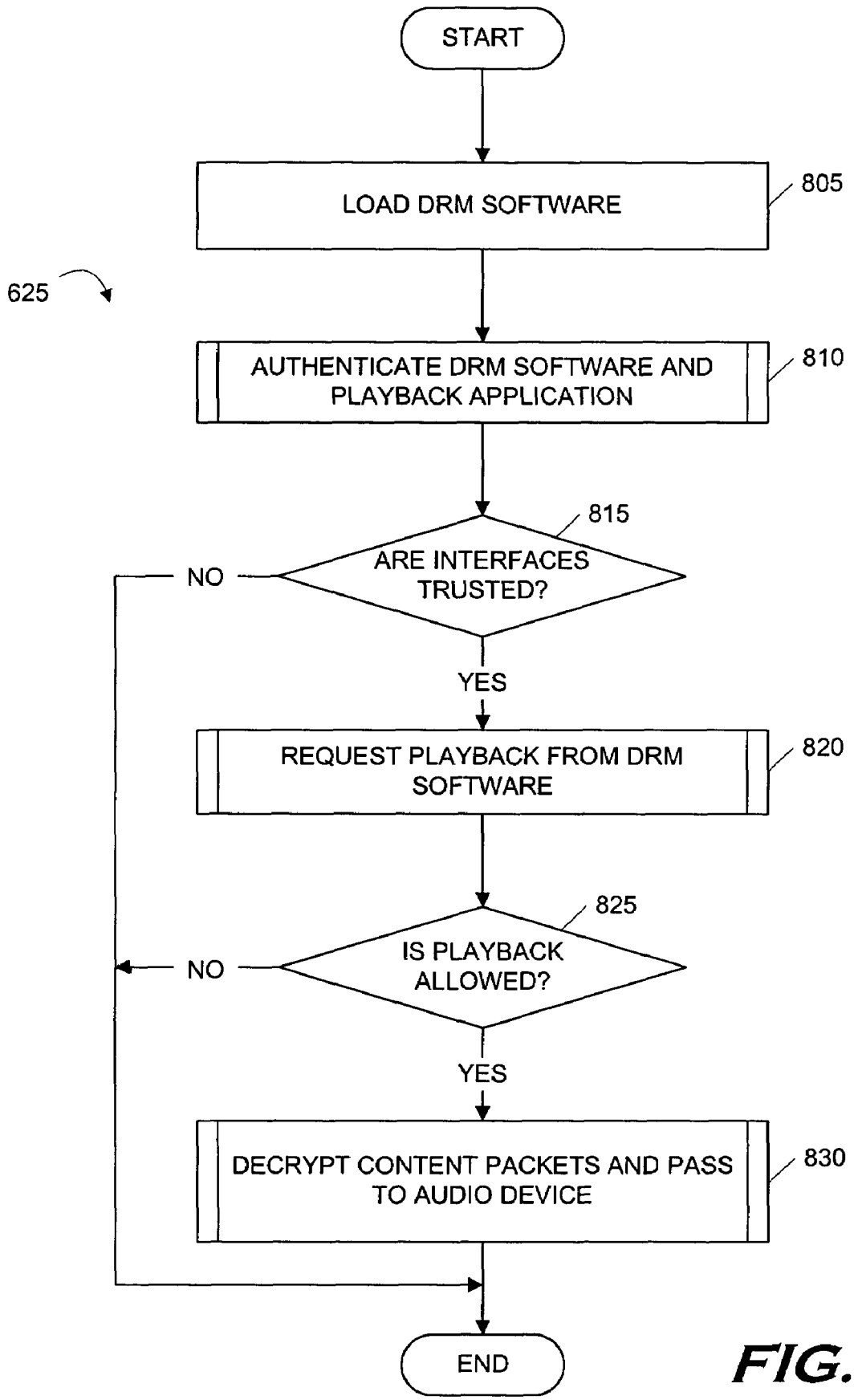
FIG. 8 is a flowchart illustrating, in one embodiment of the invention, a process that is performed by a user's computer when the user elects to play audio tracks from the protected compact disc of FIG. 1 on the computer.

In FIG. 8 there is shown a flowchart illustrating an exemplary process 625 that occurs when the user elects to play tracks. The process described in FIG. 8 corresponds to step 625 of FIG. 6. Depending on the embodiment, additional steps may be added, others removed, selected steps merged, and the ordering of the steps rearranged. Starting at a step 805, the client computer 150 loads digital rights management software. In one embodiment, this software is the unique and global DRM modules described above; in another it is a separate application. Then, at a step 810, validation may occur. In the illustrated embodiment, the playback module validates the authenticity of the DRM software and the DRM software in turn validates the authenticity of the playback application. The validation process is described in greater detail below in the discussion with respect to FIG. 10. Then, at a decision step 815, the client computer 150 determines whether the software interfaces can be trusted by each other, based on the process of step 810. If trust has not been established, then the process ends. If trust is established, then the process continues to a step 820, where the client computer 150 requests playback from the digital rights management software. The playback request process is described in greater detail below in the discussion with respect to FIG. 11.

Next, at a decision step 825, the client computer 150 determines whether, according to the DRM software, playback is allowed. If playback is not allowed, the process ends. If, however, playback is allowed the client computer 150 continues to a step 830, where it decrypts the audio content and passes it to an audio device for playback. The encryption and playback process is described in greater detail below in the discussion with respect to FIG. 12.

Figure 9:
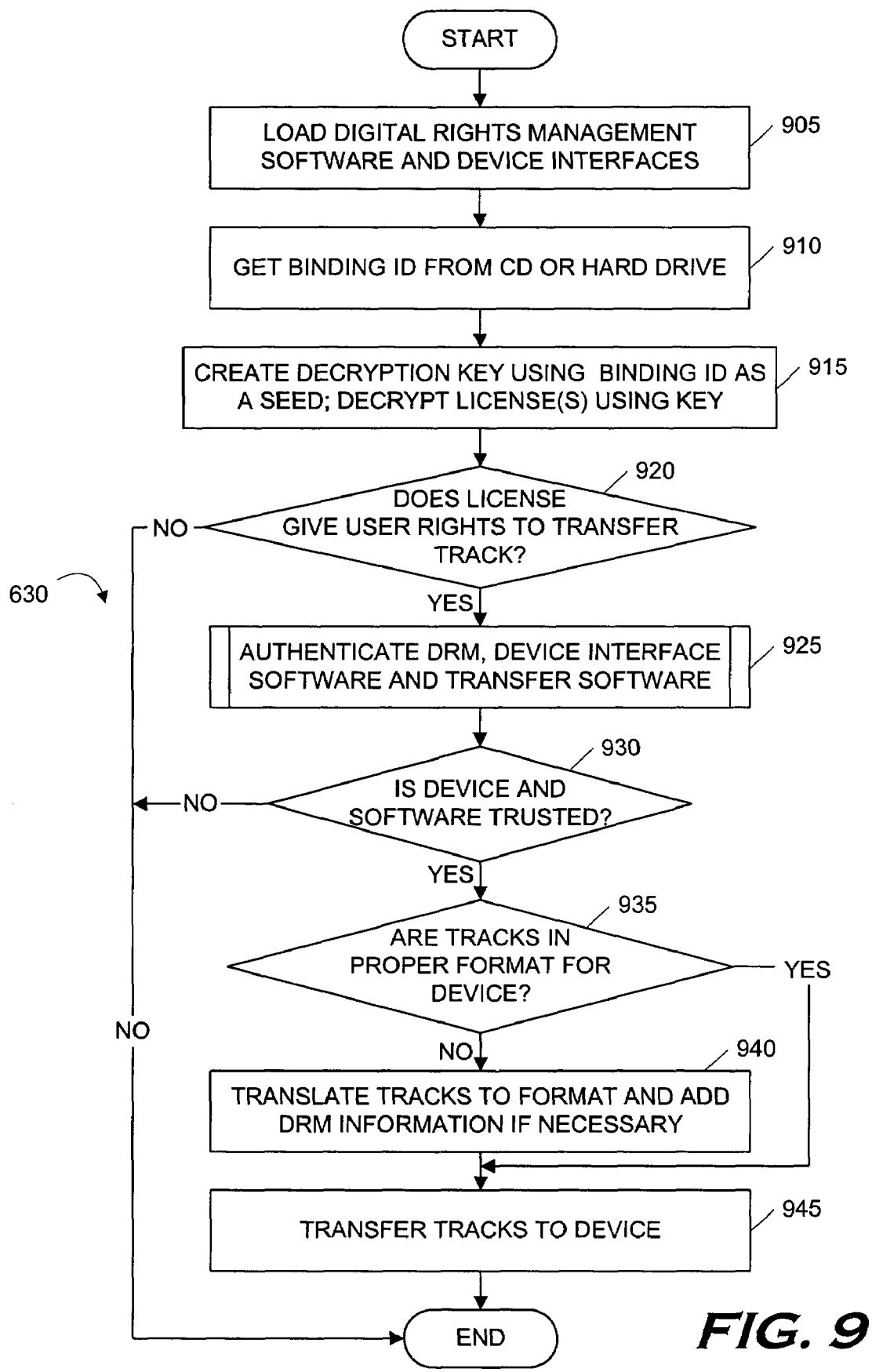
FIG. 9 is a flowchart illustrating, in one embodiment of the invention, a process that is performed by a user's computer when the user elects to transfer audio tracks from the protected compact disc of FIG. 1 to an external device.

In FIG. 9 there is shown a flowchart illustrating an exemplary process 630 that can be performed when the user elects to transfer tracks to a portable device or to burn tracks to a writable compact disc. The process described in FIG. 9 corresponds to step 630 of FIG. 6. Depending on the embodiment, additional steps may be added, others removed, selected steps merged, and the ordering of the steps rearranged. For clarity, the discussion with respect to FIG. 9 will discuss "transferring" tracks. This should also be understood to include burning of tracks, and relevant differences in the processes will be noted. Note also that in one embodiment the tracks in question are being transferred from the protected compact disc 100, and in another they are being transferred from the hard drive 162; the process is substantially similar in both embodiments. Starting at a step 905, the client computer 150 loads digital rights management software and any device interfaces that are needed for communication with the device. Next, at a step 910, the client computer 150 receives the particular binding ID of the medium where the tracks that will be transferred are stored. In one embodiment this is the compact disc identifier 101, in another it is the hard drive identifier 164. Continuing to a step 915, in one embodiment the client computer 150 creates a decryption key using the binding ID of step 910 as a seed and then decrypts the stored license or licenses using that key. As was discussed above, in an alternate embodiment there is no separate encryption key for the license or licenses and the binding ID is simply checked against the binding ID encrypted with the license or licenses.

Next, the client computer 150 continues to a decision step 920, where it determines if the relevant licenses give the user the right to transfer the track. If the client computer 150 determines that the user does not have the rights to transfer the track, the process ends. If, however the user does have rights to transfer the track, the client computer 150 continues to a step 925, where it validates the DRM software, software that is used to transfer the tracks to the portable device or compact disc burner, and the transferring application. The validation process is described in greater detail below in the discussion with respect to FIG. 10. Note that in an alternate embodiment validation of the software takes place after the DRM loading in step 905. Next, at a decision step 930, the client computer 150 determines whether or not the device and software are trusted. If not, the process ends. If trust has been established, the client computer 150 continues to a decision step 935, where it determines if the tracks are in the proper format for the device. In the case of a portable device, this can involve determining if the device requires a special file format or has its own digital rights management software. In the case of compact disc burning this determination can involve determining if the audio tracks are in proper format for inclusion on an audio CD. If the tracks are not in the proper format, then the client computer 150, at a step 940, translates the tracks into the proper format and adds digital rights management information if necessary. In one embodiment, this step also involves the decrypting of the audio tracks, in a manner similar to that discussed below in the discussion with respect to FIG. 12. Finally, regardless of whether translation was required, the client computer 150 transfers the tracks to the device or burns them to a writable compact disc.

Figure 10:
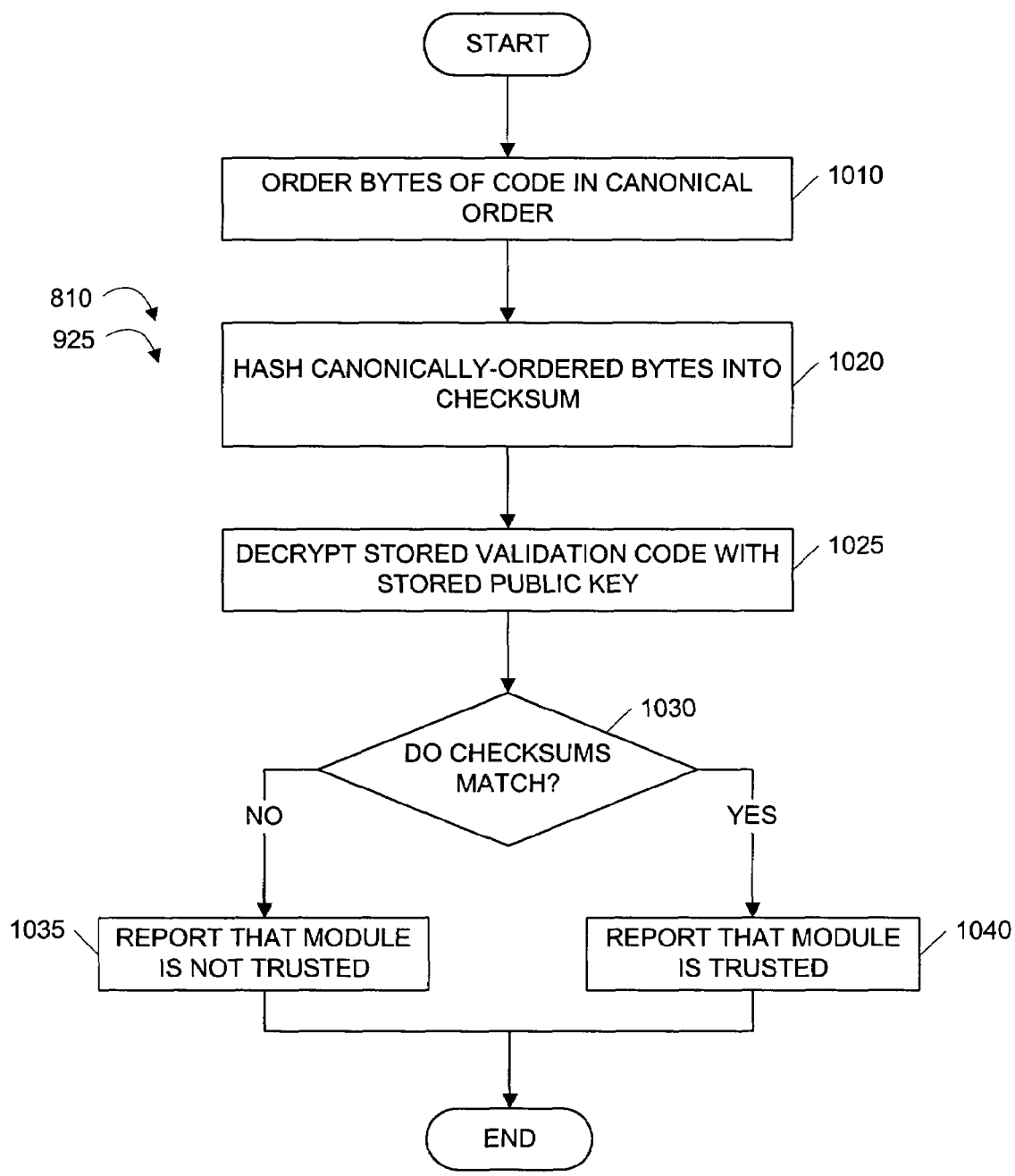

In FIG. 10 there is shown a flowchart illustrating an exemplary process 810 or 925 that can be performed when a software module is being validated. The process described in FIG. 10 corresponds to steps 810 of FIG. 8 and 925 of FIG. 9. Depending on the embodiment, additional steps may be added, others removed, selected steps merged, and the ordering of the steps rearranged. In one embodiment, the process of FIG. 10 happens only the first time a piece of software is loaded. In another embodiment, the process happens every time a software module is loaded. In one embodiment, each software module performs validation on other modules itself. In yet another embodiment, all software calls are routed through a single tamper-resistant calling and validation module, which keeps track of the amount of time that has passed since the last time each piece of software has been validated. Thus, when a software module is called, the calling module validates the called module if a pre-determined amount of time has passed. Additionally, while the process of FIG. 9 utilizes stored validation codes, in one embodiment these codes are stored separately from the software modules they are associated with. In another embodiment the codes are incorporated into their software modules.

Starting at a step 1010, the client computer 150 orders the bytes of the module to be validated in canonical order. As discussed above in the discussion with respect to FIG. 4, the ordering is done to ensure an unchanging format for the software module, so that it can be consistently validated no matter how it is being stored in memory. Continuing to a step 1020, the client computer 150 hashes the canonically-ordered bytes into a checksum. While no specific hashing algorithm is required of this step, it is important that the algorithm produce identical results as the hash done in step 420, so that proper validation can occur. Next, at a step 1025, the stored validation code, which is in reality a cryptographically-signed hash checksum, is decrypted by the stored public key. The use of the public key to decrypt the validation code ensures that the code itself can be trusted to be authentic. In one embodiment, the stored key is read separately from hard drive or compact disc, and in another it is incorporated into the validation software.

Next, at a decision step 1030 the client computer 150 determines if the checksums match. If the checksums do match the client computer 150 can be relatively certain that no tampering has occurred to the software module being validated, and at a step 1040 reports that the module is to be trusted. If the checksums do not match, the client computer 150 reports at a step 1035 that the module cannot be trusted.

Figure 11:
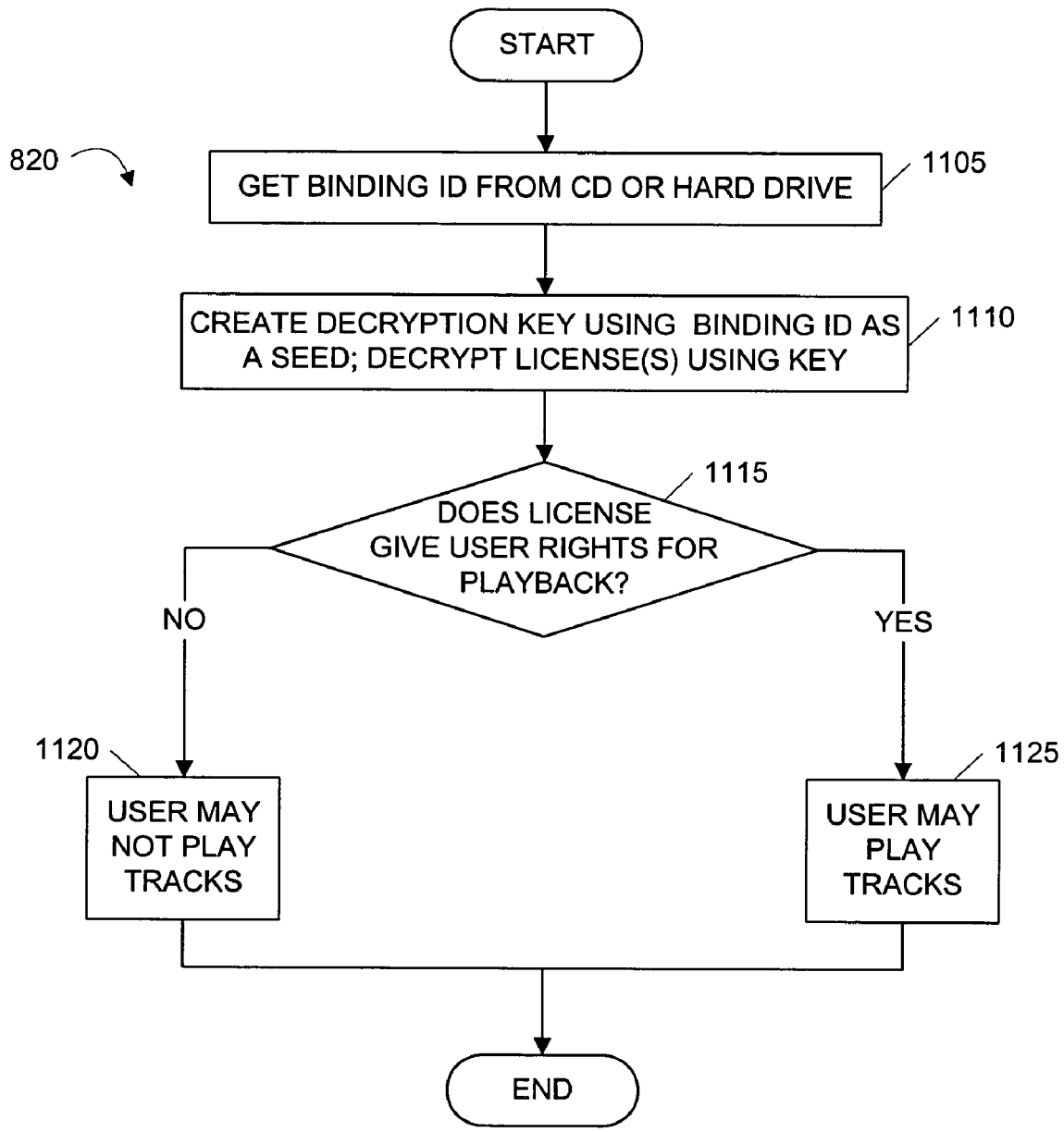
FIG. 11 is a flowchart illustrating, in one embodiment of the invention, a process that is performed by a user's computer in order to determine whether the user is permitted access to play the audio tracks from the protected compact disc of FIG. 1.

In FIG. 11 there is shown a flowchart illustrating an exemplary process 820 that can be performed when playback is requested from a DRM module. The process described in FIG. 11 corresponds to step 820 of FIG. 8. Depending on the embodiment, additional steps may be added, others removed, selected steps merged, and the ordering of the steps rearranged. Starting at a step 1105, the client computer 150 receives a binding ID; in one embodiment this is the compact disc identifier 101, in another it is the hard drive identifier 164.

The binding ID used depends on the source of the tracks to be played. Next at a step 1110, a decryption key is created using the binding ID as a seed, and the license or licenses are decrypted. As discussed above, in an alternate embodiment, a different key is used to decrypt the license and the binding ID, and the binding ID is compared to the relevant stored binding ID to ensure the tracks come from the storage or media they were bound to. Next, at a decision step 1115, the client computer 150 determines whether the decrypted license gives the user rights for playback. If the user does not have playback rights, the client computer reports that the user may not play the tracks at a step 1120. If the user does have rights, the client computer 150 reports that the user is allowed to play the tracks at a step 1125.

Figure 12:
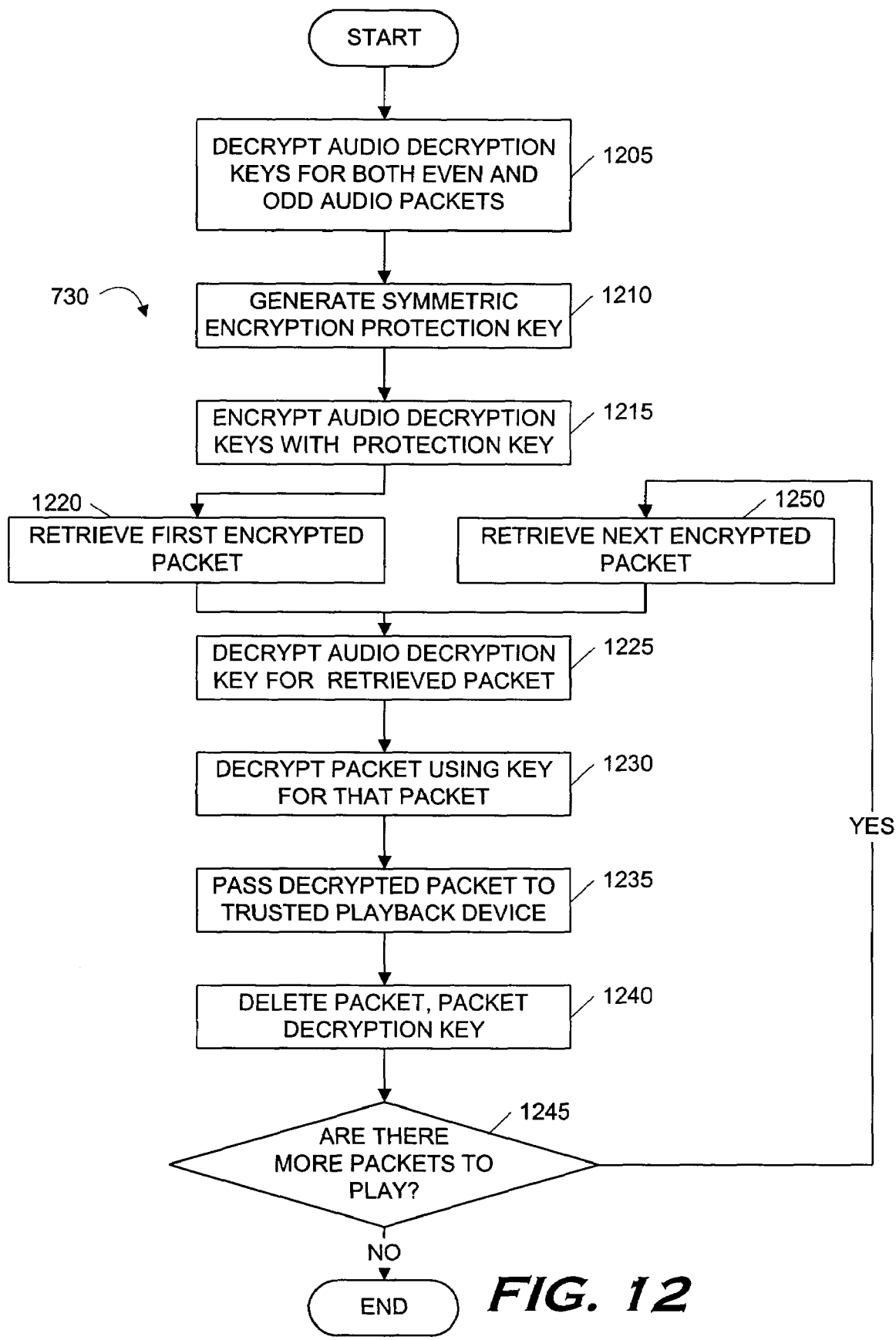
FIG. 12 is a flowchart illustrating, in one embodiment of the invention, a process that is performed by a user's computer in order to pass audio packets received from the protected compact disc of FIG. 1 to a playback device.

In FIG. 12 there is shown a flowchart illustrating an exemplary process 730 that can be performed when a protected audio track is being decrypted and passed to an audio device for playback. The process described in FIG. 12 corresponds to step 730 of FIG. 7. Depending on the embodiment, additional steps may be added, others removed, selected steps merged, and the ordering of the steps rearranged. The illustrated embodiment in FIG. 12 represents a number of steps designed to ensure high security for the audio, as it is decrypted in this process, and thus unprotected. In one embodiment, all steps of FIG. 12 are done in tamper-resistant code for added security.

Starting at a step 1205, the client computer 150 uses the generic and unique DRM modules to decrypt the two encrypted audio decryption keys. In another embodiment, more or fewer keys may be used depending on the number of keys created in FIG. 3. In one embodiment, the client computer 150 can then use these audio encryption keys to decrypt the protected audio. However, because unlicensed users of the protected compact disc 100 may attempt to gain access to the audio encryption keys while they reside in memory, at step 1210 a new, symmetric, protection key is created and then used to encrypt the audio decryption keys at a step 1215. In one embodiment, a symmetric protection key is used in these steps because symmetric keys use fewer computing resources than the public/private key pairs contained in the DRM modules. Because of this, in this embodiment the audio decryption keys can now be decrypted every time a packet is to be decrypted, and then deleted, without compromising system resources. In an alternate embodiment, no protection key is used. In yet another, an asymmetric key pair is used to encrypt the audio decryption keys while they reside in memory, although this could affect system performance.

The decryption of the actual audio begins at a step 1220, where the first encrypted packet of the audio track to be played is retrieved. Next, at a step 1225, the audio decryption key corresponding to the packet retrieved is decrypted. Then, at a step 1230, the encrypted audio packet is decrypted using its audio decryption key. As stated above, in the illustrated embodiment, the use of symmetric encryption for these steps helps assure that they will minimally affect system performance, although symmetric keys are not required. Next, at a step 1235, the decrypted packet is passed to the trusted playback device. And then, at a step 1240, the packet and its decryption key are promptly deleted from memory in order to protect the audio content. Finally at a decision step 1245, the client computer 150 determines if there are more packets left to play. If so, the client computer 150 continues to a step 1250 where it retrieves the next packet and the decryption process for that packet begins. If not, the process ends.

The above-detailed software and compact disc system protects digital audio content from unauthorized users and would-be copiers while providing a relatively transparent and robust system that allows a user many of the activities associated with usage of a compact disc, both on an audio compact disc player and on a computer. While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed:

1. A method of protecting media content stored on a storage medium, the method comprising:

creating a first session on the medium, the first session containing digital data stored in a first format and representing all or substantially all of the media content, the digital data in the first session being readable by an electronic device configured to read digital data in the first format;

creating a second session on the medium, the second session containing digital data stored in a second format and representing all or substantially all of the media content, the digital data in the second session being readable by a media player associated with a computing device and configured to read the digital data in the second format;

including on the second session at least one digital rights management license describing allowed uses for the digital data;

including on the second session digital rights management software; encrypting the digital data in the second session so that the digital rights management software does not grant access to the digital data stored in the second session unless the digital rights management software determines that a requested access complies with the allowed uses described in the at least one digital rights management license; and preventing the media player associated with the computing device configured to read the digital data in the second format from accessing the digital data in the first format.

2. The method of claim 1, wherein encrypting the data comprises:

separating the media content into packets of data;

encrypting the packets;

storing the encrypted packets to the medium; and storing at least one decryption key on the medium such that the digital rights management software, when executed by a computer, causes the computer to use the at least one decryption key to decrypt the packets.

3. The method of claim 2, wherein encrypting the data further comprises:

creating at least two encryption keys;

for every encryption key, encrypting at least one packet with that key;

encrypting every packet with the at least two encryption keys; and wherein the at least one decryption key comprises sufficient decryption keys to decrypt all of the encrypted packets.

4. The method of claim 3, wherein the encryption keys are symmetric, and wherein the method further comprises:

generating at least one protection encryption key for each of the at least two encryption keys;

encrypting each encryption key with an associated protection encryption key;

storing the at least one encrypted encryption key on the medium; and storing at least one protection decryption key on the medium, such that the at least one protection decryption key can be used to decrypt the at least one encryption key.

5. The method of claim 4, wherein:

the at least one protection encryption key comprises a generic protection decryption key and a unique protection encryption key; and the at least one protection decryption key comprises a generic protection decryption key and a unique protection decryption key.

6. The method of claim 4, wherein storing the at least one protection decryption key comprises integrating the protection decryption key inside the digital rights management software.

7. The method of claim 1, wherein the digital rights management software is tamper-resistant.

8. The method of claim 7, further comprising:

storing a binding identifier on the medium, wherein the binding identifier is associated with the at least one digital rights management license, and is used by the digital rights management software to determine whether or not to allow the requested access to the digital data in the second session, and wherein the binding identifier cannot be duplicated onto another storage medium.

9. The method of claim 8, wherein:

storing the binding identifier comprises encrypting together the at least one license and a copy of the binding identifier that is associated with the at least one license; and the digital rights management software compares a decrypted copy of the binding identifier to the binding identifier present on the medium before allowing the requested access.

10. The method of claim 8, wherein:

storing the binding identifier comprises:

creating a license encryption key from the binding identifier; and encrypting the at least one license with the encryption key;

wherein the digital rights management software decrypts the at least one license using a decryption key created from the binding identifier to determine whether or not to allow the requested access to the digital data in the second session.

11. The method of claim 1, wherein:

the digital data on the first session comprises a plurality of separate audio recordings;

the at least one digital rights management license comprises a plurality of digital rights management licenses; and at least one of the plurality of digital rights management licenses describes allowed uses for a specific recording.

12. The method of claim 1, wherein the medium is a compact disc.

13. A compact disc, comprising:

a first session readable by a compact disc player;

first data representing all or substantially all media content on the compact disc, the first data stored on the first session and protected so that the first data cannot be decoded into a renderable media presentation by an optical media drive;

a second session readable by an optical media drive;

second data representing all or substantially all of the media content on the compact disc, the second data stored on the second session and encrypted so that the second data cannot be decoded into a renderable media presentation by the compact disc player;

at least one digital rights management license, written to the second session, and describing allowed uses for the second data;

digital rights management software stored on the second session that, when executed by a computer, causes the computer to use the digital rights management license to determine whether or not a requested use of the second data is allowed, and to prevent the requested use of the second data if the license does not permit the requested use;

at least one decryption key stored on the second session and used by the digital rights management software to decrypt the second data.

14. The compact disc of claim 13, wherein the encrypted second data comprises a plurality of encrypted packets of data.

15. The compact disc of claim 14, wherein the plurality of encrypted packets are encrypted with a plurality of encryption keys, and wherein the at least one decryption key comprises sufficient decryption keys to decrypt all of the encrypted packets.

16. The compact disc of claim 13, wherein the at least one decryption key is integrated inside the digital rights management software.

17. The compact disc of claim 13, wherein the digital rights management software is tamper resistant.

18. The compact disc of claim 17, further comprising:

a binding identifier stored on the compact disc, associated with the at least one digital rights management license, and used by the digital rights management software to determine whether or not to allow the requested use of the second data, wherein the binding identifier cannot be duplicated onto another compact disc.

19. The compact disc of claim 18, further comprising:

the at least one license and a copy of the binding identifier encrypted together and stored on the second session; and wherein the digital rights management software, when executed by the computer, also causes the computer to compare a decrypted copy of the binding identifier to the binding identifier present on the disc before allowing a requested use of the second data.

20. The compact disc of claim 18, wherein:

the at least one license is encrypted using an encryption key created by using the binding identifier as a seed; and the digital rights management software, when executed by the computer, also causes the computer to decrypt the at least one license using a decryption key created from the binding identifier to determine whether or not to allow a requested use of the second data.

21. The compact disc of claim 13, wherein:

the second data on the second session comprises a plurality of separate audio recordings;

the at least one digital rights management license comprises a plurality of digital rights management licenses; and at least one of the plurality of digital rights management licenses describes allowed uses for a specific audio recording.

22. The compact disc of claim 21, wherein the plurality of digital rights management licenses contain a license describing uses for a plurality of the audio recordings in addition to the at least one license that describes uses for a specific audio recording.

23. The compact disc of claim 13, further comprising at least one validation code associated with the digital rights management software wherein the at least one code represents a cryptographically-signed hash of a canonical representation of at least one section of the digital rights management software code, and wherein the digital rights management software, when executed by the computer, causes the computer to detect tampering or replacement of the at least one section of code at the time the code is executed by performing a runtime hash of the at least one section of code and comparing the runtime hash to the stored cryptographically-signed hash.

24. The compact disc of claim 13 further comprising protected playback software that, when executed by the computer, causes the computer to play the second data.

25. A system for protecting media content, the system comprising:
a computing device;
media content stored on the computing device;
at least one digital rights management license stored on the computing device and describing allowed uses for the media content;
digital rights management software stored on the computing device and that, when executed by the computing device, causes the computing device to use the digital rights management license to determine whether or not a requested use of the media content is allowed, and to prevent the requested use of the media content if the license does not permit the requested use; and
wherein the media content, the at least one digital rights management license, and the digital rights management software were installed on the computing device from a single storage medium that contained the content, the license, and the software.

26. The system of claim 25, further comprising:
a first identifier associated with the at least one digital rights management license;
a hard drive, coupled to the computing device;
a second identifier, stored on the hard drive; and
wherein the digital rights management software, when executed by the computing device, causes the computing device to compare the first identifier to the second identifier before allowing a requested use of the media content.

27. The system of claim 25, wherein the digital rights management software comprises a generic module and a unique module.

28. The system of claim 25, further comprising:
at least one validation code corresponding to at least one predetermined software module; and
validation software that, when executed by the computing device, causes the computing device to compute at least one checksum for the at least one software module and compare the at least one checksum against the validation code to determine if the at least one predetermined software module should be trusted.

29. The system of claim 28, wherein:
the at least one validation code is a cryptographically-signed hash of a canonically-ordered series of bytes from the at least one predetermined software module; and comparing the at least one checksum against the validation code comprises:
decrypting the cryptographically-signed hash;
performing a hash on the at least one software module; and
comparing the results of the two hashes to see if they match.

30. The system of claim 25, wherein the storage medium is a compact disc.

31. A method of transferring digital data from a removable storage medium to a storage device coupled to a computing device, the method comprising:
copying the digital data from the removable storage medium to the storage device;
copying at least one digital rights management license from the removable storage medium to the storage device, the digital rights management license describing types of access that are allowed for the digital data;
copying digital rights management software from the removable storage medium to the storage device, wherein the digital rights management software, when executed by the computing device, causes the computing device to use the at least one digital rights management license to determine whether or not an access to the digital data is permitted.

32. The method of claim 31, further comprising:
determining whether or not the computing device has secure playback software that can read the digital data; and
installing secure playback software if the computing device does not have the software.

33. The method of claim 31, further comprising encrypting the at least one digital rights management license, and wherein the copied digital rights management software, when executed by the computing device, causes the computing device to deny access to the digital data on the storage device unless the at least one digital rights license is decrypted.

34. The method of claim 33, wherein encrypting the at least one digital rights management license comprises:
generating a binding identifier for the storage device;
storing the identifier on the storage device;
generating an encryption key from the binding identifier;
encrypting the at least one digital rights management license using the generated encryption key; and
wherein the digital rights management software, when executed by the computing device, causes the computing device to use the binding identifier to create a decryption key for the at least one license.

35. The method of claim 31, wherein the removable storage medium is a compact disc.

36. A method of playing media content stored on a removable storage medium the method comprising:
reading digital data stored in a second format and representing all or substantially all of the media content, wherein the removable storage medium also contains digital data stored in a first format that also represents all or substantially all of the media content; and
determining from at least one digital rights management license stored on the removable storage medium whether or not playback of the digital data stored in the second format is allowed.

37. The method of claim 36, wherein the removable storage medium is a compact disc.

38. The method of claim 36, further comprising authenticating digital rights management software also stored on the removable storage medium that, when executed by a computer, causes the computer to use the at least one digital rights management license to determine whether or not to allow playback of the digital data.

39. The method of claim 36 wherein:
the digital data stored in the first format is encrypted, and
the method further comprises decrypting the encrypted data.

40. The method of claim 39, wherein the encrypted data comprises a plurality of encrypted packets of data.

41. The method of claim 40 wherein decrypting the data comprises:
locating at least one decryption key on the removable storage medium; and
using the at least one decryption key to decrypt the packets of data.

42. The method of claim 41, wherein:
the at least one decryption key is itself encrypted with a protection encryption key; and
the removable storage medium contains at least one protection decryption key to decrypt the at least one encrypted decryption key.

43. The method of claim 42, wherein:
the protection encryption key comprises a generic protection encryption key and a unique protection encryption key; and
the at least one protection decryption key comprises a generic protection decryption key and a unique protection decryption key.

44. The method of claim 42, wherein the at least one decryption key is symmetric.

45. The method of claim 42, further comprising:
generating a symmetric playback protection key;
encrypting the at least one decryption key with the symmetric key; and
wherein decrypting the encrypted packets of digital data stored in the second format further comprises decrypting the at least one encrypted decryption key prior to decrypting the packets of data.

46. The method of claim 45, further comprises:
playing the encrypted digital data stored in the second format; and
deleting the at least one decryption key and the decrypted packets of data from memory.

47. A method of transferring digital data stored on a removable storage medium to an external device, the method comprising:
loading digital rights management software from the medium;
retrieving a digital rights management license from the medium; and
using the digital rights management license to determine whether or not a transfer of the digital data to the external device is allowed.

48. The method of claim 47, wherein the removable storage medium is a compact disc.

49. The method of claim 47, further comprising authenticating the digital rights management software.

50. The method of claim 47, wherein the external device is a compact disc burner.

51. The method of claim 47, wherein the external device is a portable audio player.

52. The method of claim 51, further comprising transferring the digital rights management software and the digital rights management license from the removable storage medium to the portable audio player.

53. The method of claim 52, wherein:
the portable audio player contains digital rights management software that is different than the software loaded from the removable storage medium; and
the method further comprises:
translating the digital rights management license into a format that the software already on the portable audio player can read; and
transferring the translated digital rights management license to the portable audio player.

54. The method of claim 47 further comprising transferring at least a portion of the digital data to the external device in response to the determination that the digital rights management license permits the transfer.

55. The method of claim 54, further comprising translating the at least a portion of the digital data into a format that the external device can read.

56. A removable computer readable storage medium storing media content and a program that, when executed by a computer, causes the computer to:
read digital data stored on the medium in a second format and representing all or substantially all of the media content, wherein the medium also contains digital data stored in a first format that also represents all or substantially all of the media content;
locate a digital rights management license stored on the medium; and
using the digital rights management license to determine whether or not a requested use of the digital data stored in the second format is allowed.

57. The medium of claim 56, wherein the medium is a compact disc.

58. The medium of claim 56, wherein the stored program further causes the computer to authenticate the program.

59. The medium of claim 56, wherein:
the digital data stored in the second format is encrypted, and
the stored program further causes the computer to decrypt the encrypted data.

60. The medium of claim 59, wherein the encrypted data comprises encrypted packets of data.

61. The medium of claim 60, wherein the stored program further causes the computer to:
locate a decryption key on the medium; and
decrypt the packets of data using the decryption key.

62. The medium of claim 61, wherein:
the decryption key is itself encrypted with a protection encryption key; and
the stored program further causes the computer to use the protection decryption key to decrypt the encrypted decryption key.

63. The medium of claim 62, wherein:
the protection encryption key comprises a generic protection encryption key and a unique protection encryption key; and
the protection decryption key comprises a generic protection decryption key and a unique protection decryption key.

64. The medium of claim 62, wherein the decryption key is symmetric.

65. The medium of claim 62, wherein the stored program further causes the computer to:
generate a symmetric playback protection key;
encrypt the decryption key with the symmetric key; and
decrypt the encrypted decryption key prior to decrypting the packets of data.

66. The medium of claim 65, wherein the stored program further causes the computer to:
  play the encrypted digital data stored in the first format, and
  delete the decryption key and the decrypted packets of data from memory.

67. A method of playing media content stored on a removable storage medium the method comprising:
  reading digital data stored in a first format and representing all or substantially all of the media content, wherein the removable storage medium also contains digital data stored in a second format that also represents all or substantially all of the media content; and
  preventing an audio player configured to read the digital data stored in the second format from reading the digital data in the first format.

68. The method of claim 67 wherein the first format comports to the Redbook compact disc standard.

* * * * *